US011182399B2

(12) United States Patent
Joyner et al.

(10) Patent No.: US 11,182,399 B2
(45) Date of Patent: Nov. 23, 2021

(54) EFFECTIVE CORRELATION OF MULTIPLE TIME-SERIES RESULT SETS

(71) Applicant: Spirent Communications, Inc., San Jose, CA (US)

(72) Inventors: David Joyner, Raleigh, NC (US); Rahul Patel, La Palma, CA (US)

(73) Assignee: SPIRENT COMMUNICATIONS, INC., San Jose, CA (US)

( * ) Notice: Subject to any disclaimer, the term of this patent is extended or adjusted under 35 U.S.C. 154(b) by 65 days.

(21) Appl. No.: 16/391,604

(22) Filed: Apr. 23, 2019

(65) Prior Publication Data

US 2020/0073866 A1 Mar. 5, 2020

Related U.S. Application Data

(60) Provisional application No. 62/726,907, filed on Sep. 4, 2018.

(51) Int. Cl.
*G06F 7/00* (2006.01)
*G06F 16/00* (2019.01)
*G06F 16/2458* (2019.01)
*G06F 16/14* (2019.01)
*G06F 16/21* (2019.01)
*G06F 16/28* (2019.01)
*G06F 16/2455* (2019.01)

(52) U.S. Cl.
CPC ........ *G06F 16/2477* (2019.01); *G06F 16/156* (2019.01); *G06F 16/212* (2019.01); *G06F 16/24561* (2019.01); *G06F 16/283* (2019.01)

(58) Field of Classification Search
None
See application file for complete search history.

(56) References Cited

U.S. PATENT DOCUMENTS

| | | |
|---|---|---|
| 4,922,491 A | 5/1990 | Coale |
| 5,812,826 A | 9/1998 | McLain, Jr. |
| 6,252,891 B1 | 6/2001 | Perches |

(Continued)

OTHER PUBLICATIONS

Spirent Communications: Inspired Innovation. Reference Manual: Spirent TestCenter System. Aug. 2006. 134 pages.

(Continued)

*Primary Examiner* — Tuan A Pham
(74) *Attorney, Agent, or Firm* — Ernest J. Beffel, Jr.; Andrew L. Dunlap; Haynes Beffel & Wolfeld LLP

(57) ABSTRACT

The technology disclosed relates to a method for storing and time-correlating real-time and queryable test results of a test of a device under test (DUT). The method includes initiating the test applied to the DUT to collect real-time data from a multitude of data streams for multiple aspects of the DUT, the collected data including counters and fact-type values, the collected data having imperfectly synchronized time bases and the collected data being collected from different sources asynchronously at different times, specifying a recording time interval for recording the data collected among multiple databases, recording data according to the specified recording time interval, such that each piece of the recorded data is associated with a particular time interval, and at a conclusion of the test, correlating the recorded data with the test configuration data about a test state in the respective time intervals.

16 Claims, 14 Drawing Sheets

(56) References Cited

U.S. PATENT DOCUMENTS

| | | |
|---|---|---|
| 6,341,285 B1 | 1/2002 | Blott et al. |
| 6,381,239 B1 | 4/2002 | Atkinson et al. |
| 6,477,486 B1 * | 11/2002 | Ram ..................... G06F 11/273 702/183 |
| 6,487,677 B1 | 11/2002 | Jantz et al. |
| 6,654,701 B2 | 11/2003 | Hatley |
| 6,728,929 B1 | 4/2004 | Luong |
| 7,016,340 B1 | 3/2006 | McKinion |
| 7,133,805 B1 | 11/2006 | Dankenbring et al. |
| 7,158,907 B1 | 1/2007 | Soldo |
| 7,162,377 B2 | 1/2007 | Amrod et al. |
| 7,181,360 B1 | 2/2007 | Nikolac et al. |
| 7,194,488 B2 | 3/2007 | Highleyman et al. |
| 7,272,114 B1 | 9/2007 | Barkan |
| 7,328,144 B1 | 2/2008 | Grier et al. |
| 7,342,897 B1 | 3/2008 | Nader et al. |
| 7,376,550 B1 | 5/2008 | Bokaemper et al. |
| 7,562,255 B2 | 7/2009 | El Far et al. |
| 7,603,266 B2 | 10/2009 | Ramanathan |
| 7,636,653 B1 | 12/2009 | Chan et al. |
| 7,958,387 B2 | 6/2011 | Silverman et al. |
| 8,533,524 B2 | 9/2013 | Silverman et al. |
| 8,954,781 B2 | 2/2015 | Silverman et al. |
| 2002/0007461 A1 | 1/2002 | Garrison |
| 2002/0156885 A1 | 10/2002 | Thakkar |
| 2003/0033406 A1 | 2/2003 | John et al. |
| 2003/0172177 A1 | 9/2003 | Kersley et al. |
| 2004/0003068 A1 | 1/2004 | Boldman et al. |
| 2004/0190519 A1 | 9/2004 | Dugatkin |
| 2004/0240440 A1 | 12/2004 | Wild et al. |
| 2005/0066086 A1 | 3/2005 | Ramanathan |
| 2005/0259594 A1 | 11/2005 | Smith |
| 2006/0013252 A1 | 1/2006 | Smith |
| 2006/0045021 A1 | 3/2006 | Deragon et al. |
| 2008/0031151 A1 | 2/2008 | Williams |
| 2008/0198742 A1 | 8/2008 | Kaempfer |
| 2008/0201312 A1 | 8/2008 | Posner |
| 2009/0296590 A1 | 12/2009 | Joyner |
| 2011/0273719 A1 * | 11/2011 | Froggatt ............ G01B 9/02044 356/446 |
| 2014/0266765 A1 * | 9/2014 | Neeley ..................... G08B 5/00 340/691.6 |
| 2016/0080243 A1 * | 3/2016 | Kodama ............... G06F 11/263 370/252 |
| 2018/0024204 A1 * | 1/2018 | Novak ................... G01R 13/20 324/764.01 |

OTHER PUBLICATIONS

Notice of Allowance, dated Feb. 12, 2010. U.S. Appl. No. 12/131,944. 10 pages.

Notice of Allowance, dated Jun. 25, 2010. U.S. Appl. No. 12/131,944. 10 pages.

* cited by examiner

| Fact | Value | Interval |
|------|-------|----------|
| A1 | 1 | 0 |
| A2 | 2 | 1 |
| A3 | 2 | 2 |
| A4 | 0 | 3 |

FIG. 8A

| Fact | Value | Interval |
|------|-------|----------|
| B1 | 5 | 0 |
| B2 | 2 | 1 |
| B3 | 0 | 2 |
| B4 | 10 | 3 |

FIG. 8B

| Fact | Value | Interval |
|------|-------|----------|
| C1 | 0 | 0 |
| C2 | 1 | 1 |
| C3 | 0 | 2 |
| C4 | 2 | 3 |

FIG. 8C

EFFECTIVE CORRELATION OF MULTIPLE TIME-SERIES RESULT SETS

CROSS-REFERENCE

This application claims the benefit of U.S. Provisional Patent Application No. 62/726,907, entitled, "EFFECTIVE CORRELATION OF MULTIPLE TIME-SERIES RESULT SETS," filed on 4 Sep. 2018. The priority application is hereby incorporated by reference herein for all purposes.

RELATED APPLICATION(S)

This application is related to the following commonly assigned applications:

U.S. patent application Ser. No. 12/130,963, entitled, "Realtime Test Result Promulgation From Network Component Test Device," filed 30 May 2008, now U.S. Pat. No. 7,958,387, issued 7 Jun. 2011.

The related application(s) are hereby incorporated by reference herein for all purposes.

FIELD OF INVENTION

The technology disclosed relates to collection and correlation of real-time data obtained from testing a "device or system under test" (hereinafter "DUT") in order to provide the ability to (i) query and present real-time (e.g., "live" results) including correlations between control-plane statistics, data-plane statistics, configuration values, etc., and (ii) query and present "end-of-test" results including correlations between control-plane statistics, data-plane statistics, configuration values, etc.

BACKGROUND

The technology disclosed relates to collection and correlation of real-time data obtained from testing a "device or system under test" (hereinafter "DUT") in order to provide queryable "end-of-test" results that are correlated to the real-time data collected during the test.

The initial architecture of Spirent TestCenter™ (STC), which is a family of network testing systems, is approximately 13 years old. Previously, the results from STC have been stored in an internal relational database. Although STC collects and displays real-time statistics on its user interface while tests are running, only "end of test" results are stored in this database. After testing is completed, a "pass/fail" result is rendered in the user interface of a companion application, such as Spirent Result Reporter, which can be used to query detailed "end-of-test" statistics. For example, the Result Reporter can run reports using the "end-of-test" statistics for distribution.

However, these "end-of-test" statistics fall short of being able to provide the user with a queryable database that provides both seamless "real-time" (during the test) results as well as the "end-of-test" results. Previously, such a database has not been available because a solution has not been developed that has been able to correlate test configurations, learned values, data-plane statistics and control-plane statistics. One of the reasons such a solution has not been developed is that (i) the data obtained from the STC instrument layer (IL) has not been time synchronized and (ii) that data, to the extent that it was collected, is not stored in such a way that it could be correlated (e.g., the data was simply temporarily displayed on a user interface and then discarded).

For example, effective correlation of multiple fact tables commonly requires the use of time. A query might need to analyze how data-plane forwarding performance is affected by particular protocol events (e.g., border gateway protocol (BGP) events). For example, one might want to analyze whether packet loss within a particular time range correlates with BGP route flapping, which occurs when a router alternately advertises a destination network via one route then another (or as unavailable, and then available again) in quick sequence. An unreliable approach would be to correlate using the timestamp facts from transmit stream statistics, receive stream statistics, and BGP protocol statistics. This approach is unreliable because STC measurement timestamps typically have microsecond precision and these are the timestamps that are recorded in the fact tables. Because measurement processes are asynchronous and split between hardware and software implementations, the chance of any two timestamp values exactly matching is very low. This is the case even when the measurements were made at "approximately" the same time. Accordingly, this "time-stamp" approach does not provide reliable results.

In other words, conventional methods of performing high data-volume stress tests on equipment will display information about the test as it is being conducted, but they do not store real-time results for subsequent query and analysis. This greatly limits the amount of post-test results processing that can be performed after the fact. For example, a long-running test may fail due to a transient error at a particular point in time. Because this real-time data is not saved in an efficient way, current methods are limited in their ability to drill down into this time range to answer "why did this occur?" Additionally, conventional methods do not allow for correlation of separately-collected measurements or result sets. Also, conventional methods implement an online transactional processing (OLTP) style relational database schema that is driven by configuration structure rather than results structure. This makes analytic queries much harder to develop, because such queries require very complicated join operations to traverse long "chains" of relations, and results in correspondingly more expensive queries for the database to execute. Using this conventional approach, indexes and materialized views are not effectively employed to speed up analytic queries.

SUMMARY OF THE INVENTION

The technology disclosed solves this problem by (i) creating a seamless "real-time" and "end-of-test" results experience, (ii) allowing for correlation of (a) test configurations (e.g., correlation of configuration information of tester as well as configuration information of the equipment that is being tested, such as the device or system under test (DUT)), (b) learned values (e.g., correlation of pieces of data that are being collected as a result of the tests, such as Ethernet MAC address), (c) data-plane statistics (e.g., getting data packets from one side to the other side), and (d) control-plane statistics (e.g., software stack protocol data transmissions) in analytic queries, (iii) allowing for correlation of Spirent TestCenter (STC) measurements with external data sources (iv) improving scalability, efficiency, and performance of results processing, improving the look and feel of canned reports, and (v) delivering a modern stand-alone web user interface with embedding in the STC user interface.

Regarding item (ii), the technology disclosed can test layers 2-3 of the Open System Interaction (OSI) software model. For example, counters of transmitted, received, error (sequence, frame, headers), latency, out of sequence, time out/lost, are referred to as data-plane statistics. The control-plane statistics are software protocol stack implementations for BGP and multiprotocol label switching (MPLS), signaling for video stream setup that sets up protocols before the data-plane test proceeds. Previously, it has not been possible to obtain a time series record of control-plane issues that lead to bad performance on the data plane. The technology disclosed will be able to achieve this by correlating data in a unique manner.

The data-plane statistics can include 70 or more counters and well as additional fact-type values. The number of counters and fact-type values included in the control plane is a function of the number of control-plane protocols that are in use. For example, the protocol count can be 10 or more, where each protocol has a variable number of counters and fact-type values. Fact-type values can be numeric counter values or they can be of other data types.

Furthermore, regarding item (ii) test configuration data reveal aspects of the test equipment that help the user understand the nature of the test, such as a scale test, stressing the number of sessions or flows. The technology disclosed will normalize the performance by number of sessions or flows. The source can be either STC or the DUT for the base against which to normalize.

Additionally, regarding item (ii), learned value is discovered by interactions with the DUT, such as, Ethernet MAC address. Data of such values need to be obtained during testing. Previously, the MAC addresses were not recorded in the business logic layer (BLL). A test user finds it useful to have MAC addresses for use in an analytic query.

Particular aspects of the technology disclosed are described in the claims, specification and drawings.

BRIEF DESCRIPTION OF THE DRAWINGS

FIGS. 8A, 8B and 8C illustrate fact tables for storing values of various facts.

DETAILED DESCRIPTION

Figure 1:
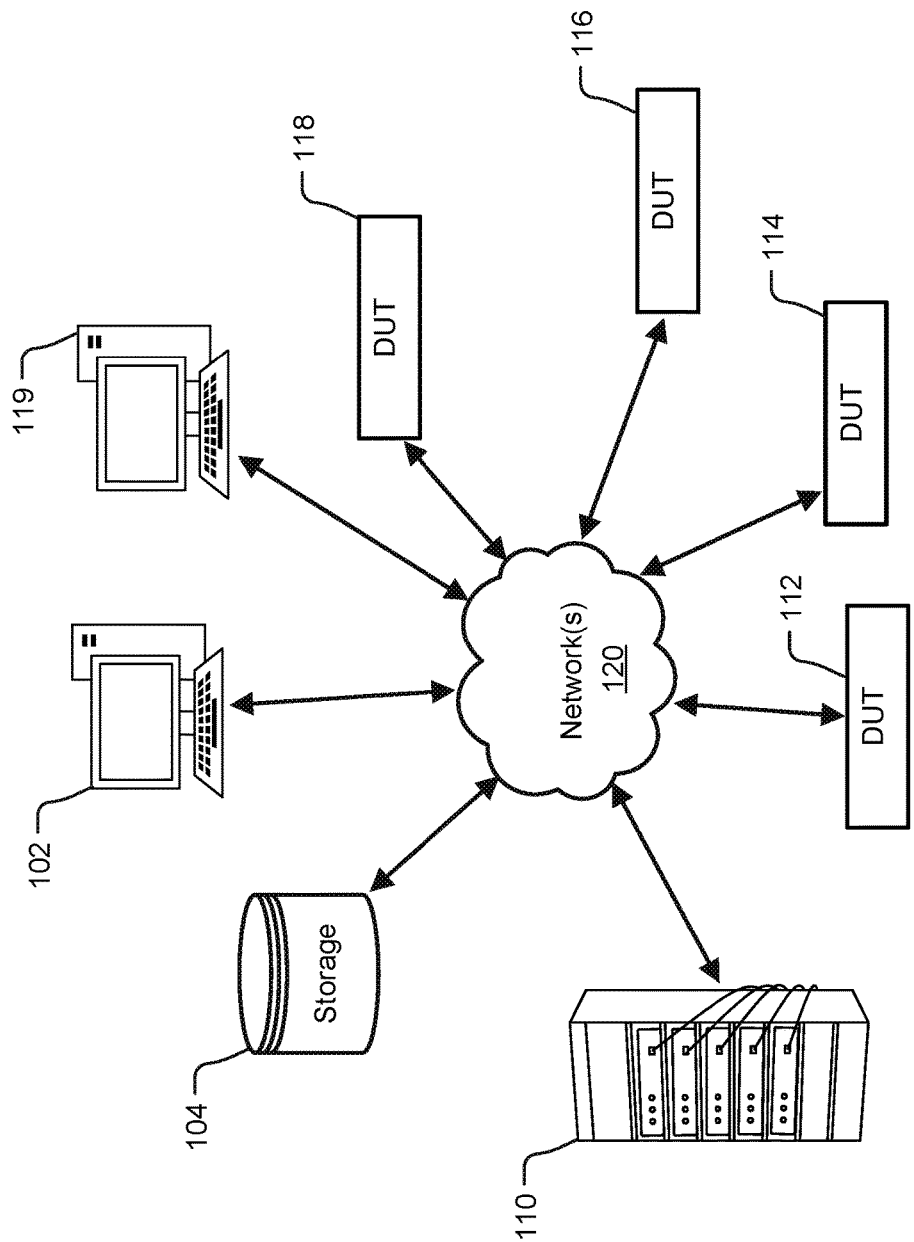
FIG. 1 illustrates an example testing environment for testing a device under test (DUT).

The following detailed description is made with reference to the figures. Example implementations are described to illustrate the technology disclosed, not to limit its scope, which is defined by the claims. Those of ordinary skill in the art will recognize a variety of equivalent variations on the description that follows.

Introduction

The technology disclosed makes no fundamental distinction between real-time and end-of-test results. The technology disclosed can use an online analytical processing (OLAP) style "star schema" to store multi-dimensional data in a relational database. A primary characteristic of a star schema is that one or more fact tables reference dimension tables. Fact table columns either contain measurements, i.e. actual "facts", or foreign keys to dimension tables. Also, because all STC test results are inherently time-series data, each fact table includes a timestamp-type value. From the perspective of the fact table, there is no difference between a row of real-time result data and a row of end-of-test data. STC now stores both real-time and end-of-test results in the database and all of these include timestamp facts.

Dimension tables serve to add attributes to the facts, providing a way to filter, group, and label the otherwise unstructured measurements. Dimension attribute columns may be typed as strings, numbers, Booleans, or any other useful data type. Dimension tables usually have many fewer rows than fact tables but may be much wider so that each fact can be labelled with as many attributes as needed.

STC now stores its data- and control-plane statistics in fact tables. It uses separate fact tables for transmit and receive statistics at both the stream and port levels. Each emulated protocol also stores its statistics and events in one or more fact tables. These fact tables frequently share a common set of dimensions, e.g. stream and port identifiers, making the star schema more of a "constellation schema." Other configuration parameters and learned values, e.g. MAC addresses learned as a result of address resolution protocol (ARP) and/or neighbor discovery (ND) protocol exchanges, are also stored as dimension attributes.

On the query side, STC allows for a single result set to be rolled-up (i.e. grouped and aggregated), drilled-down (i.e. traversing through multiple levels of dimensions to isolate data), or sliced/diced (i.e. filtered) in order to answer analytic queries. Advanced aggregates can also be used to calculate percentiles or perform linear regressions.

STC can now correlate multiple fact tables into a unified result with a single query. These fact tables typically share common dimension attributes, and this is useful for matching up measurements on a per-stream, per-port, or per-test basis.

As previously described, effective correlation of multiple fact tables commonly requires the use of time. For example, a query might need to analyze how data-plane forwarding performance is affected by BGP protocol events. Does packet loss within a particular time range correlate with BGP route flapping? A naïve approach would be to correlate using the timestamp facts from transmit stream statistics, receive stream statistics, and BGP protocol statistics. This sounds like the correct approach but does not work with actual implementations. STC measurement timestamps typically have microsecond precision and these are the timestamps that are recorded in the fact tables. Because measurement processes are asynchronous and split between hardware and software implementations, the chance of any two timestamp values exactly matching is very low. This is the case even when the measurements were made at "approximately" the same time.

The technology disclosed uses interval queries to solve this problem. Instead of correlating fact tables using timestamps, we aggregate facts into intervals and use those instead. To continue with the example above, the technology disclosed provides a better approach that first aggregates the three fact tables on 15-second intervals—literally on :00, :15, :30, and :45 boundaries—and then to further correlate using these intervals. This has the effect of "throwing away" timestamp precision and "matching up" separately-measured time-series data. Fifteen seconds is an acceptable interval for this particular example, but if needed the technology disclosed could scale that interval up or down. This approach also gives us the opportunity to choose an appropriate aggregation function. For example, if a given test has multiple BGP fact observations within any given 15-second interval the technology disclosed has the flexibility of taking their sum, average, maximum, etc.

The technology disclosed is not limited to correlation of result data only taken from its own tests. For example, a system or device under test may have its own configuration, counters, or metrics available in a database. All systems typically produce operational logs containing valuable information. If the external data sources do not include timestamps, then the technology disclosed can treat this data as dimensional. If timestamps are available, then the technology disclosed can treat the external data sources as facts and perform interval-based correlations as described above. The data that is collected from STC during a test of a DUT can be collected into varying IL embedded databases associated with the hardware running the test on the DUT. Because the space available for the IL embedded databases is small (e.g., solid state memory limitations), the data that populates theses databases tends to be somewhat transient. The technology disclosed is capable of capturing and recording the data from the IL embedded databases according to the user configured time interval (e.g., a user configured recording interval). This frees up the IL embedded databases for the collection of new data during the test and allows the test data to be uniformly correlated according to a single time interval, even though the time stamps of the data collected across the multiple IL embedded databases are imperfectly synchronized with each other. Now that the data is recorded and correlated according to the user configured recording interval, the recorded and correlated data can be queried using the same user configured recording interval or it can be queried using a different user defined query interval that is greater than the user configured recording interval. Note that the IL embedded database does not record time series data. As such, if an observation (data point) for a particular aspect of the DUT is available/observed multiple times within, for example, a user configured recording interval of 1 second, then the IL embedded database will simply overwrite the particular observation with the new one.

At the time of querying according to the user defined query interval, the technology disclosed, as mentioned above, is capable of averaging, summing, identifying the maximum value or identifying the minimum value of the data for a particular aspect of the DUT when there is more than one piece of data for that particular aspect of the DUT within the user defined query interval. For example, suppose that data is recorded and correlated for a particular aspect of the DUT at a user configured recording interval of 1 second and supposed that the user decides to run a query and sets the user defined query interval to 5 seconds. There would be 5 data points available for that user defined query for that particular 5 second query interval because the data was recorded and correlated at a higher (1 second) resolution. When this situation arises, the user-defined query is capable of summing, averaging, or identifying the maximum or the minimum value of the 5 data points and reporting the results accordingly. Note that in this example, the user defined query interval cannot be less than the 1 second user configured recording interval.

If the user configured recording interval has a higher resolution than what data for a particular aspect of the DUT can be obtained, then the recording and correlating of the data for that particular aspect of the DUT will simply maintain a value of that particular data point for the particular aspect of the DUT. For example, if the user configured recording interval is set to 1 second, but the DUT only provides a data point for a particular aspect every 5 seconds, then the technology disclosed will keep the same data point value for that particular aspect over 5 intervals (until the next data point can be obtained from the DUT for that particular aspect).

Star schemas are often described as denormalized, where each "dimension" is represented by a single table. The nature of this denormalization is that the same attribute value may be repeated in many different dimension rows. Each distinct combination of attribute values requires a new dimension row. As a result, many analytic queries have a simple join structure: a single result table is joined with one or more of its dimension tables. Even more complicated queries involving multiple fact tables still have a relatively simple join structure. This makes queries easier to develop and more efficient for the database to execute. Fact and dimension tables are also heavily indexed to support efficient slice and dice operations.

The technology disclosed implements "materialized views" which make queries for the last set of real-time results for a particular fact table very efficient. Instead of forcing the database to process large volumes of real-time data in order to pick out the most recent set of observations, a materialized view provides quick access to this same information.

These techniques can be implemented using relational databases, such as a relational-OLAP (i.e., an R-OLAP) database or a different type of data store, such as a simple columnar datastore.

The technology disclosed can provide a user configurable interval, such that the interval is not limited to 15 seconds, as described in the example above. If the user configures a 1 second interval, then the data resulting from the test can be analyzed using 1 second intervals or a longer interval, such as 15 seconds. One second intervals might be on the edge of what can be collected. The gold standard in some regression tests is no packet errors, where 595 million bi-directional packets per second per test port is commonplace.

This allows the user to easily query and identify what happened to cause a total failure of the DUT or transient issues that did not cause total failure but did cause performance issues of the DUT. For example, a bug in a protocol stack could crash a route and require reconfiguration and re-initialization. Packet errors would be something that can be seen in the data plane. The industry wants perfect data plane performance, even during rerouting. So, it's worthwhile to find the source of the problem.

An example of multiple data streams (sets) of data and number of counters and fact-values from the IL is provided in the table below.

| Name | Facts from Instrument Layer (IL) |
|---|---|
| autosartimesync_can_stats | 27 |
| bfd_session_stats | 11 |
| bgp_afi_safi_stats | 5 |
| bgp_ls_scale_stats | 6 |
| bgp_session_stats | 57 |
| dhcpv4_block_stats | 30 |
| dhcpv6_block_stats | 32 |
| ecpri_device_stats | 35 |
| ecpri_type_5_message_stats | 5 |

-continued

| Name | Facts from Instrument Layer (IL) |
|---|---|
| ieee1588v2_clock_stats | 21 |
| ieee1588v2_clock_sync_stats | 30 |
| ieee80211_client_stats | 273 |
| ieee8021as_clock_sync_stats | 24 |
| igmp_device_stats | 6 |
| igmp_host_group_stats | 8 |
| isis_router_stats | 50 |
| rx_port_basic_stats | 132 |
| rx_port_cpu_stats | 28 |
| rx_stream_stats | 57 |
| tx_port_basic_stats | 52 |
| tx_port_cpu_stats | 26 |
| tx_stream_stats | 11 |
| ospfv2_session_stats | 33 |
| ospfv3_router_stats | 46 |
| pim_router_stats | 21 |
| ppp_block_stats | 50 |
| roe_block_stats | 23 |
| rsvp_te_stats | 32 |
| TOTAL | 1131 |

FIG. 1 illustrates an example testing environment for testing a device under test. Specifically, FIG. 1 illustrates that a testing environment 100 includes a client computer 102 that runs and/or provides access to a user interface, storage 104, a testing device 110, and several devices under test (i.e., DUT 112, DUT 114, DUT 116 and DUT 118) connected via a network 120. Additionally, a third party system 119 can be included in the testing environment 100 so as to allow a third party to monitor or observe results from the test.

While the testing environment 100 illustrates multiple DUTs, it is possible to just test one DUT (e.g., DUT 112) at a time. The DUT 112 can be any networked device such as a router, server or switch that the testing device 110 is testing. A user can connect to the testing device 110 via the network 120 using the client computer 102 or using some other method, such as directly connecting a laptop (wired or wirelessly) to the testing device 110. The user can implement the client computer 102 or other means to load a testing configuration onto the testing device 110 from the storage 104. Once the testing configuration is loaded and executed by the testing device 110 the DUT 112 will be subject to various tests and real-time data will be collected, correlated and stored. This collecting and correlating is described in more detail below with reference to FIGS. 2-10C. The testing device 110 may include its own storage for storing testing configurations and collecting test data.

In some implementations, the testing device 110 can include an interface through which the user can issue a series of commands manually to the DUT 112 as part of a manual test for the DUT 112. Testing environment 100 is just a high-level illustration, such that in reality there can be multiple hardware and/or software layers between each of the illustrated components. For example, a proxy module (not illustrated) can be implemented between the testing device 110 and the DUT 112 and can be configured to receive information of both the testing device 110 and the DUT 112, such that issued commands are sent through the proxy module from the testing device 110 to the DUT 112. For example, the proxy module can store the commands in cache memory or on persistent storage, such as rotating storage media or a solid state memory.

The storage 104 can store a library of commands used to test the DUT 112. Such commands can be stored in test sequences. Such commands can be stored as steps or sequences of steps that can be created using, for example, the client computer 102 and saved in the storage 104 as a test scenario or test configuration. The test scenario/configuration can also be stored in other locations, such as on the client computer 102 or the testing device 110. As a result, the user does not need to manually enter each testing command to be sent to the DUT 112. Instead, the user can choose from a certain test step or sequence of test steps, wherein the testing steps contain sequences of commands that are stored by or accessible to client computer 102 and the testing device 110.

After choosing the test step or sequence of test steps, the sequence of commands that form the test step or the sequence of test steps are then implemented by the testing device 110, transmitted to and run on the DUT 112. As such, the testing device 110 can perform previously run tests or stored testing steps and sequences without having to input the commands that make up a testing step that is run in a manual test.

The responses of the DUT 112 are relayed back through network 120 to the testing device 110, the storage 104 and/or the client computer 102. By way of example, if the DUT 112 is a router, the test response can include information such as the bandwidth of the router. Following up on responses from the DUT 112, the testing device 110 can issue further commands. The testing device 110 can record the responses of the DUT 112 on its own internal storage and well as the storage 104. Real-time results can also be transmitted to the client computer 102 for display on a graphical user interface for easy monitoring by the user. The information obtained from the DUT 112 can be stored in various types of memory, such as the IL, the BLL and a database (e.g., a relational database).

Various types of protocols can be implemented by the testing environment 100. In some implementations the testing environment 100 can be configured to implement SSH, SNMP, HTTP, HTTPS protocols or other web-based protocols. The network 120 can include multiple networks, some wired and some wireless.

The third party system 119 can access a record of interactions. For example, the third party system 119 can request viewing of commands issued during a test and the responses of the DUT 112 to such commands, which are stored by the storage 104 or other components of the testing environment 100. This allows a third party to view the interactions between the testing device 110 and the DUT 112 using the third party system 119, without the testing device 110 having to store the test results in a separate location for the third party, such as on a separate server. As a result, the third party can assist the user or the testing device 110 in real time as the user runs a manual test, a semi-automated test or a fully-automated test. In some implementations, the third party can see that the DUT 112 responded to a command in a certain way and suggest and communicate to the user or testing device 110 the next testing steps that should be run.

Additionally, the third party system 119 can act as a second tester and issue commands to the DUT 112 via the network 120 and the testing device 110. The DUT 112 can receive and run the commands issued by the third party, such that the commands can be relayed in a manner that leaves the DUT 112 unaware that more than one entity is issuing commands.

Figure 2:
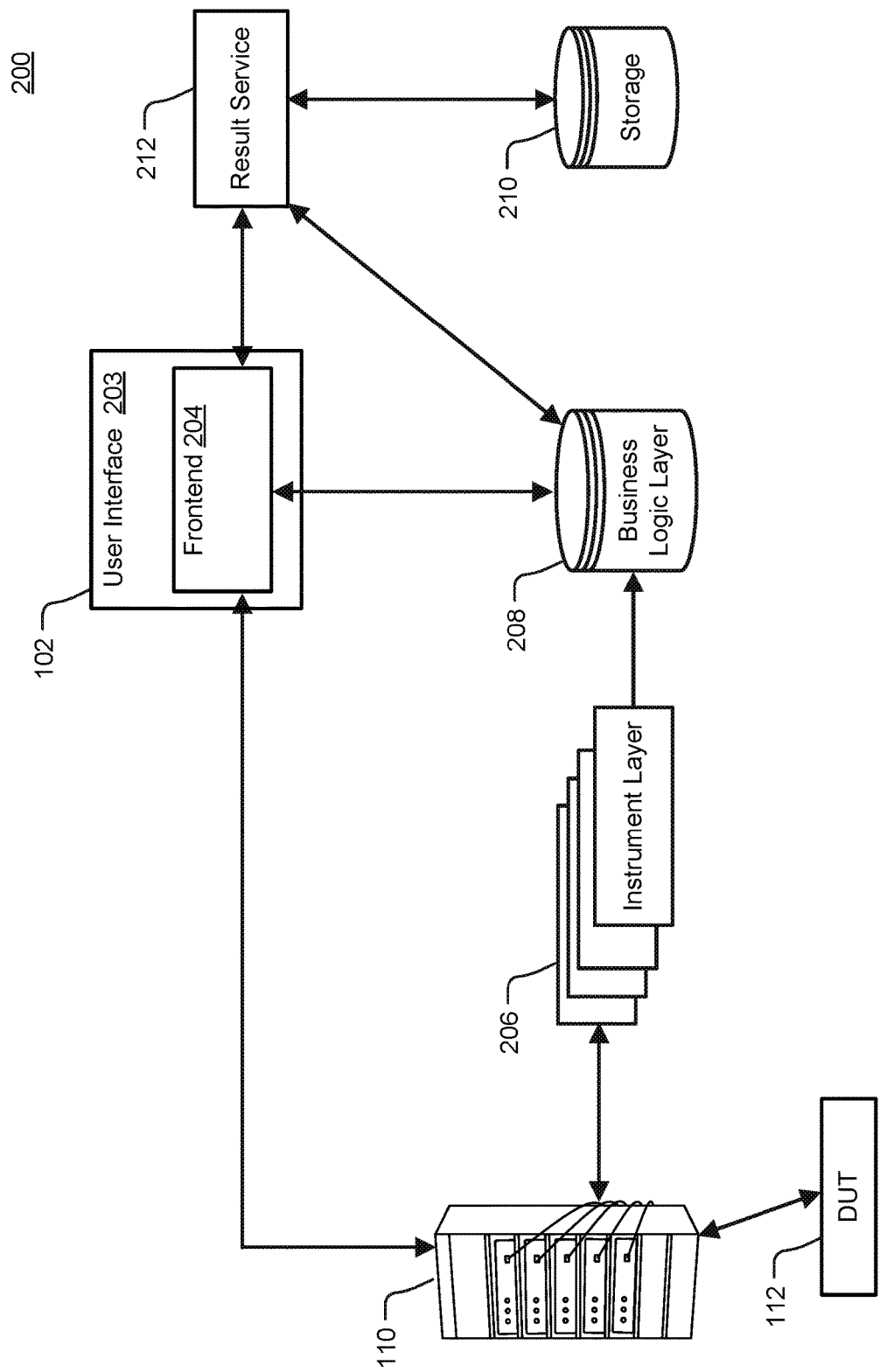
FIG. 2 provides an illustration of an example environment for testing a DUT and correlating data.

FIG. 2 provides an illustration of an example environment for testing a DUT and correlating data. Specifically, the environment 200 includes a user interface 203 and front end 204 that can be implemented and/or accessed by, for example, the client computer 102 of FIG. 1. The environment 200 also includes the testing device 110 and the DUT 112 of FIG. 1, as well as an instrument layer (IL) 206, a business logic layer (BLL) 208 a result service 212 and storage 210.

The IL 206 generally includes one or more databases. The IL 206 can be embedded into the testing device 110 or it can reside elsewhere. Further, the IL 206 records information relevant to the test being performed on the DUT 112. In an implementation, the testing device 110 can be configured to implement multiple instances of "testing modules" for testing different aspects of the DUT 112 and/or multiple DUTs. For example, a particular "testing module" can be assigned to test certain ports or aspects of the DUT 112. Each "testing module" can be a combination of hardware and software running on the testing device 110. The IL 206 can be configured to have one database dedicated to storing test results for each respective "testing module." The IL 206 is typically solid state memory, but can be other types of memory that are capable of high data transfer speeds. Because the space available for the database or databases on the IL 206 is limited, the data stored on the IL 206 is somewhat transient. In other words, there is not enough space on the IL 206 to permanently store all of the test results. Accordingly, the business logic layer (BLL) 208 must be able to capture the test results (data) from the IL 206 at certain intervals. Otherwise, the transient data on the IL 206 will be lost.

The user interface 203 sits on top of the BLL 208 and allows access to the front end 204 via, for example, the client computer 102. The BLL 208, the result service 212 and the storage 210 can be local to (located on) the client computer 102. Alternatively, some or all of the BLL 208, the result service 212 and the storage 210 can remote from the client computer 102. The user interface 203 is the user's main interface for implementing and observing one or more tests on the DUT 112. For example, the user interface 203 provides access to the front end 204 and can be used to configure and run one or more tests on the DUT 112. Further, the user interface 203 allows the user to configure the BLL 208 to capture test data from the IL 206 at certain intervals. Additionally, user can specify which data (or facts) the BLL 208 captures from the IL 206. The front end 204 allows the user to observe real-time results while one or more tests are being conducted on the DUT 112 and also allows the user to look at historical results via the result service 212 and the storage 210. The user can launch and interact with the user interface 203 and/or the front end 204 using a browser or some other type of interface running on the client computer 102.

The front end 204 also communicates back and forth with the result service 212 using various application programming interfaces (APIs), such as a QUERY API and/or a REST API, for the purpose of storing and accessing test results. For example, the result service 212 can (i) transfer data from the BLL 208 to the storage 210 to be stored in result databases such as, for example, relational databases and (ii) carry out queries initiated by the user of the client computer 102 to obtain tests results for analysis. For example, the result service 212 can be implemented by the front end 204 to perform (i) and (ii).

The user can use the user interface 203 to configure default views for observation of a test, where the default view could be triggered based on the type of test or tests being ran on the DUT 112. As described in further detail below, the front end 204, can implement the QUERY API to control/request the result service 212 to run a query on past test results or current (real-time) results as the results are being collected/observed. The front end 204 can also communicate with the result service 212 to run management and/or maintenance routines.

As the BLL 208 retrieves results from the IL 206 at intervals selected and/or configured by the user, the BLL 208 essentially pushes the results data to the result service 212. The result service 212 then communicates with storage 210. For example, the result service 212 can communicate with storage 210 to define tables, create indexes, alter tables, store test data and retrieve test data. Communications between result service 212 and storage 210 can be conducted using SQL, or some alternative language.

In one implementation the result databases of the storage 210 are logical databases within a datastore, where the datastore can be a PostgreSQL datastore (running locally). The result databases are created, updated, written and queried by the result service 212. An example API for the result service 212 is provided below after descriptions of FIGS. 1-10C and before the Particular Implementations section of this application. Additionally, the result databases can be queried by any other datastore client. In an implementation the result databases have schemas that are optimized for analytic queries that favor read performance over write performance. As mentioned above, the user has the ability to control the intervals at which facts are captured from the IL 206 and which facts are captured from the IL 206 by the BLL 208 and eventually stored to a result database on the storage 210. These facts that (usually) come from the IL 206 are stored in "result sets" in the result database. Additional facts from other sources can also be stored in the result database, such as configuration information related to the test being conducted on the DUT 112. This configuration information can come from the BLL 208 and/or the testing device 110. Dimensions of the result database (usually) come from the configuration of the test being conducted on the DUT 112 and are stored in "dimension sets." These "result sets" and "dimension sets" are discussed in further detail below. Both types of values, whether they are stored in "result sets" or "dimension sets," are written only once but can then be queried many times. This can be implemented in an online analytic processing (OLAP) or similarly related schema, such as a star schema, snowflake schema and/or constellation schema.

Figure 3:
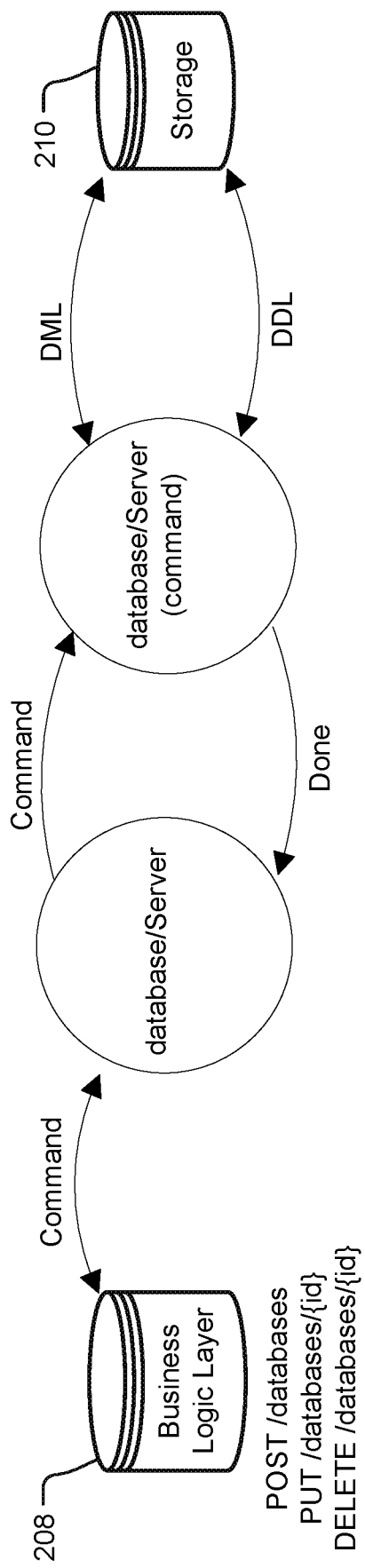
FIG. 3 illustrates an example implementation of providing a database as a service.

FIG. 3 illustrates an example implementation of providing a database as a service. Specifically, FIG. 3 is an example implementation of using the BLL 208 and the result service 212 to create, read, update and delete databases in response to an API request. The creation, reading, updating and deletion (CRUD) commands can run concurrently with one routine, such as a "goroutine" from golang or the "go" programming language. The golang runtime can map goroutines to threads, with one thread per core of a CPU. In this example implementation, datastore-specific code handles the actual result database creation. In FIG. 3, the BLL 208 uses the result service 212 to transmit commands (POST, PUT, DELETE, etc.) to a database server, which in turn uses, for example, data manipulation language (DML), data definition language (DDL), data control language (DCL), transaction control language (TCL), etc., to control creation and manipulation of the database in storage 210. The database in storage 210 can be a relational database and/or storage 210 can encompass a relational database management system (RDBMS).

Figure 4A:
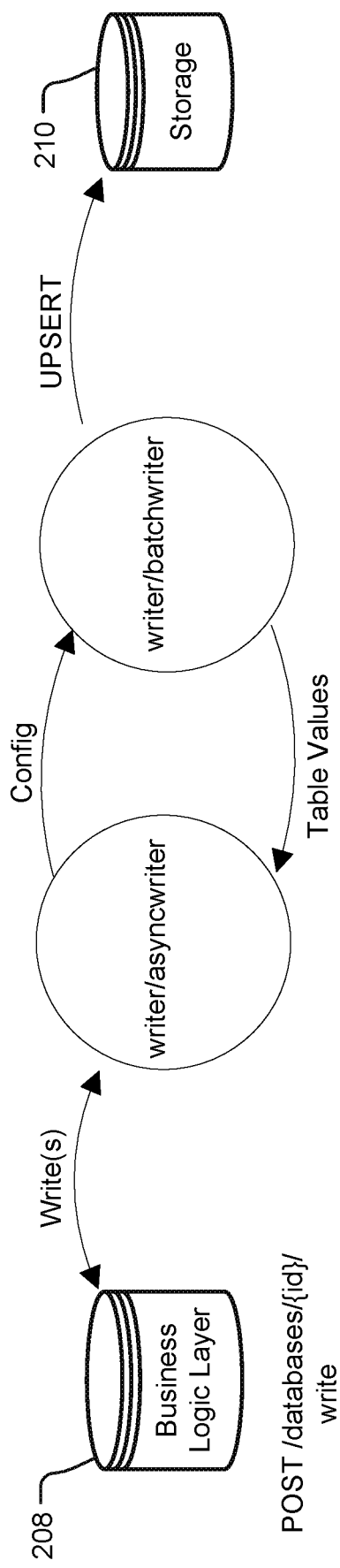
FIGS. 4A, 4B and 4C illustrate different implementations of writing to storage a star schema.
Figure 4B:
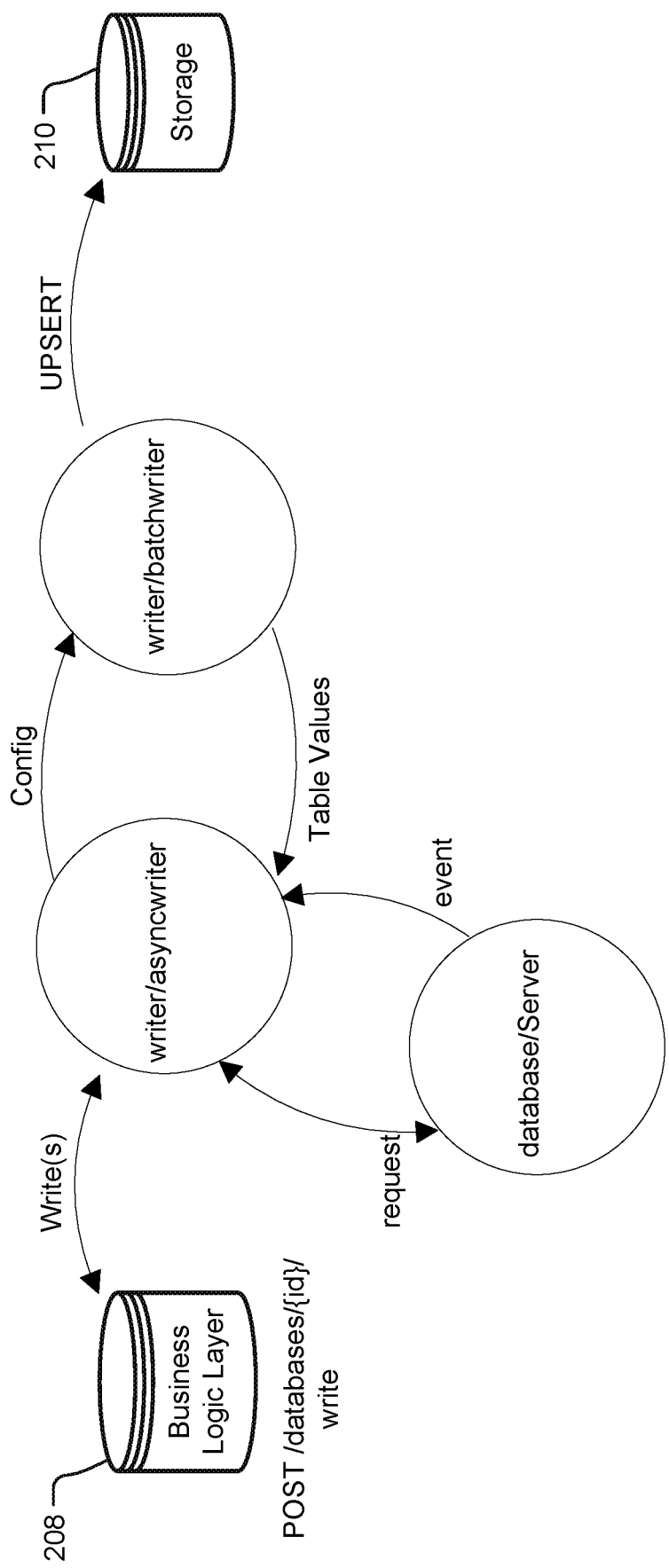
Figure 4C:
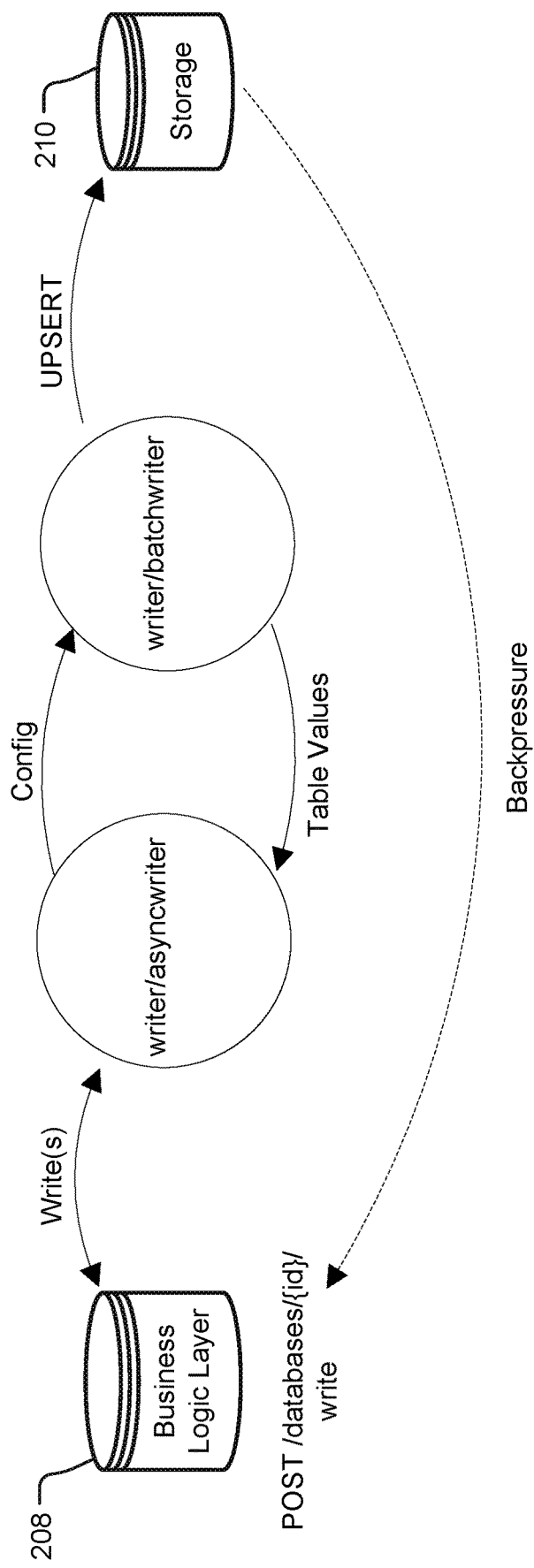

FIGS. 4A, 4B and 4C illustrate different implementations of writing to storage. Specifically, FIG. 4A illustrates asynchronous fast path writing, FIG. 4B illustrates asynchronous slow path writing and FIG. 4C illustrates writing with backpressure. Using an API, such as a "write API," existing result databases may be written at any time and dimension sets and result sets can be written using table-shaped values (e.g., an array of columns plus a two-dimensional array of rows). An example write API has been designed that (i) uses JSON encoding, (ii) allows dimension sets and result sets to be written independently or together, (iii) allows dimension keys to be under client control, (iv) allows result sets that contain new dimension keys to be written before the dimensions themselves (e.g., there are no foreign key constraints applied on the PostgreSQL side), (v) only requires the client to write values that are observed (e.g., most values are nullable), (vi) allows the BLL 208 to use its own timestamp values when it uses the API to communicate and/or interact with the result service 212 as opposed to the result service 212 providing time stamp values and (vii) allows the client to choose a write safety level (e.g., committed, queued and received) that is appropriate for a particular application. Committed means that a write response is held until all values are committed to the datastore and has the highest response latency. Queued means that a write response is sent after all values have been schema-validated but before they are committed to the data store and has a lower latency than "committed." Received means that a write response is sent after the request has been decoded and shape-checked but before schema-validation or values are committed to the datastore and has a lower latency than "queued."

Referring to FIG. 4A, an example implementation of using the result service 212 to perform asynchronous fast path writing is illustrated. Specifically, BLL 208 uses the result service 212 to transmit write commands (e.g., PUT) to an asynchronous writer, which in turn provides configuration and table values to a batch writer, which in turn issues commands, such as "upsert" to the storage 210. As mentioned above, the database in storage 210 can be a relational database and/or storage 210 can encompass an RDBMS. Some attributes of asynchronous fast path writing are that (i) a request is schema-validated and table values are forwarded to batch writers, (ii) batch writers combine writes to reduce the overall number of datastore write operations, (iii) the maximum batch size in rows and maximum batch delay are both configurable (e.g., default batch size can be 10,000 rows and default max batch delay can be 250 ms for RS and 500 ms for DS, (iv) batch writers run concurrently, one per dimension/result set, and (v) batch writers can also start concurrent writes for write-pipelining to the datastore.

Referring to FIG. 4B, an example implementation of using the result service 212 to perform asynchronous slow path writing is illustrated. Specifically, the BLL 208 uses the result service 212 to transmit write commands (e.g., PUT) to an asynchronous writer, which in turn communicates a request to a database server to resolve an unknown database definition (e.g., the database definition is old or there is a "cold start"). Once the database server resolves the unknown database definition, the asynchronous writer provides configuration and table values to the batch writer, which in turn issues commands, such as "upsert" to the storage 210, just as described above with reference to FIG. 4A. Some attributes of asynchronous slow path writing are that (i) the unknown database definition is resolved by the database server using an asynchronous request to the database server, (ii) the write request for which the database definition is unknown is queued until the database request to the database server is complete, (iii) additional writes are also queued, and (iv) once the database definition is available, the queue can be run in the same manner as the asynchronous fast path writing.

Referring to FIG. 4C, an example implementation of using the result service 212 to perform asynchronous writing with backpressure is illustrated. Specifically, the BLL 208 uses the result service 212 to transmit write commands (e.g., PUT) to an asynchronous writer, which in turn provides configuration and table values to a batch writer, which in turn issues commands, such as "upsert" to the storage 210. As mentioned above, the database in storage 210 can be a relational database and/or storage 210 can encompass an RDBMS. The storage 210 has the ability to propagate backpressure to the BLL 208 when a write channel buffer is full in order to, for example, prevent the BLL 208 from issuing commands, such as "write." For example, there can be a bottleneck between the resolution service 212 and the storage 210, because it is possible to drive more data to the resolution service 212 and/or the storage 210 that what can actually be physically written by the storage 210. Therefore, it is possible to propagate backpressure to the BLL 208 so that the BLL 208 can decide to throw away data and/or slow down the rate of write operations until the resolution service 212 and/or storage 210 can catch up. Some attributes of asynchronous writing with backpressure are that (i) writer "goroutines" are designed to always be runnable under normal circumstances, (ii) excessive datastore latency propagates through batch writers and into the asynchronous writer making it slower to service the write request input channel, (iii) the write request input channel is buffered for burst tolerance and (iv) when the buffer is full, HTTP request handlers will block the channel send, propagating backpressure to the BLL 208.

Figure 5:
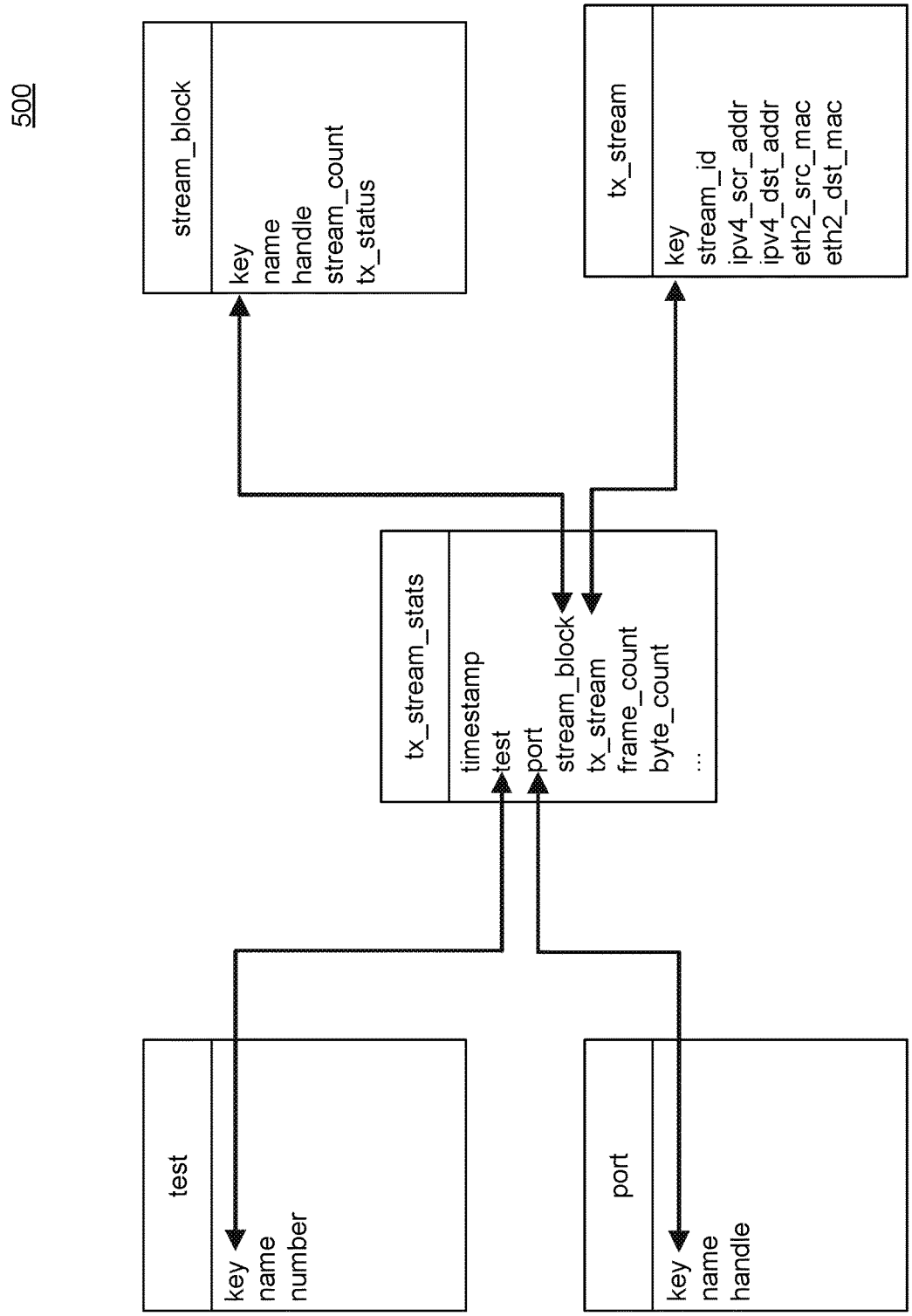
FIG. 5 illustrates a star schema.

FIG. 5 illustrates a star schema 500 with one fact table ("tx_stream_stats) and four dimension tables ("test," "port," "stream_block" and "tx_stream). The fact table of FIG. 5 has 7 types of facts, including timestamp, test, port, stream_block, tx_stream, frame_count and byte_count. Each dimension is a structure that categorizes facts and measures in order to enable users to answer a query. Each fact table includes measurements obtained from the DUT 112 as well as configuration information implemented by the testing device 110. Previously each fact had been associated with a timestamp, as discussed above. However, the technology disclosed associates each fact with an interval, which allows for correlation of data.

Figure 6:
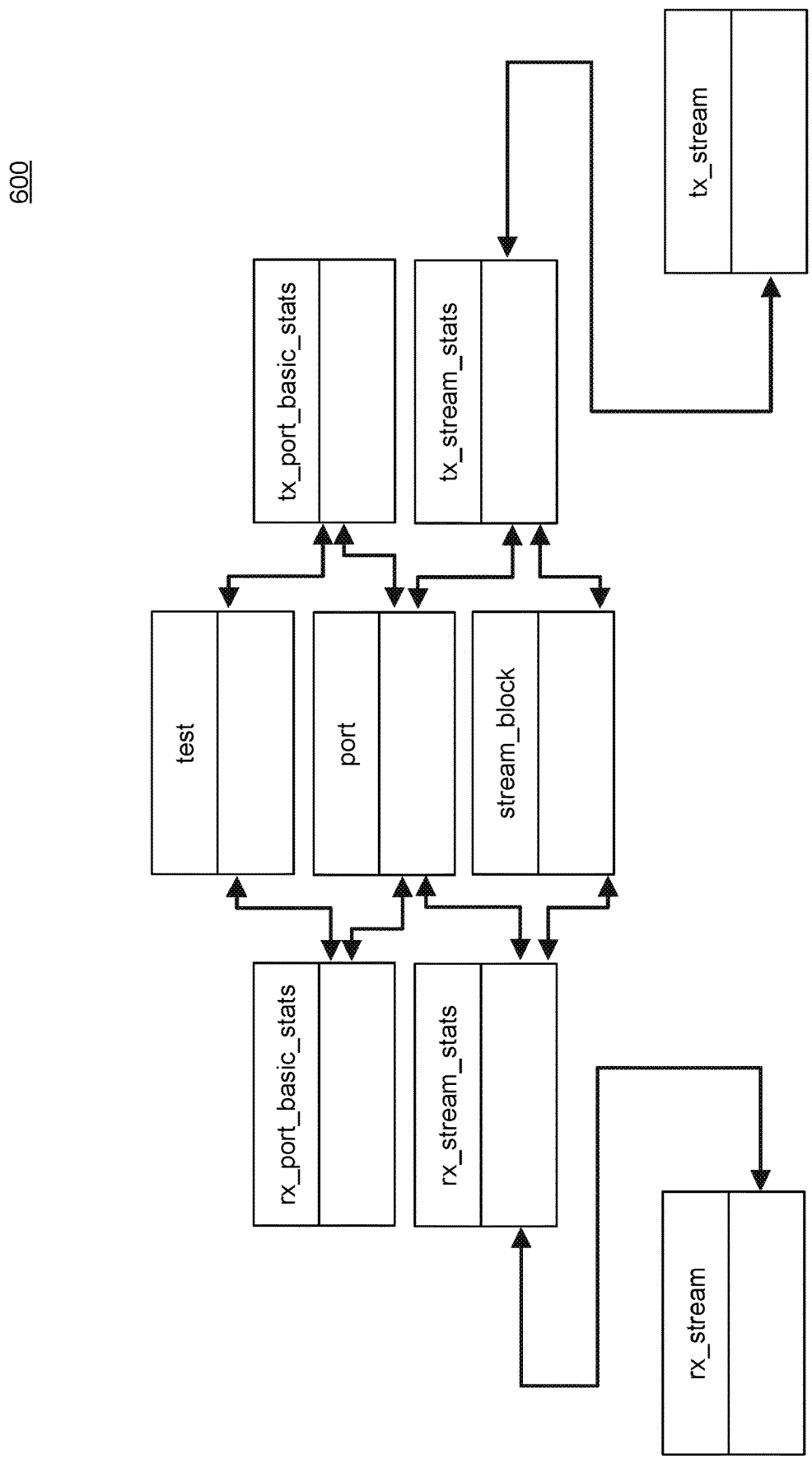
FIG. 6 illustrates a constellation schema.

FIG. 6 illustrates a constellation schema 600, in which 4 fact tables ("rx_port_basic_stats," "rx_stream_stats," "tx_port_basic stats" and "tx_stream_stats) are shared across multiple dimension tables ("rx_stream," "test," "port," "stream_block" and "tx_stream"). Each fact and dimension table illustrated in FIG. 6 includes (but not illustrated) one or more rows and data associated therewith. The schemas illustrated in FIGS. 5 and 6 are merely examples, and different types of schemas can be implemented by the technology disclosed.

Figures 7A, 7B:
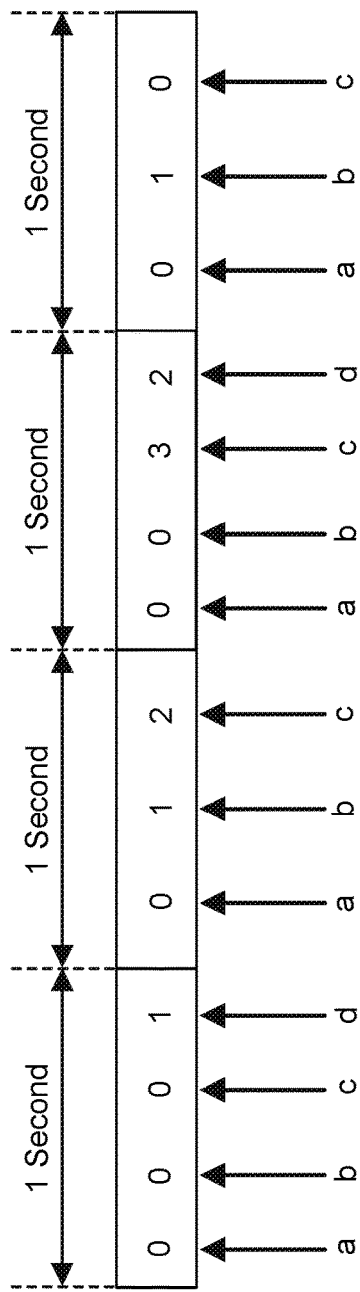
FIGS. 7A and 7B illustrate how data collected from a DUT is stored using intervals, as opposed to timestamps.

FIGS. 7A and 7B illustrate how the data collected from the DUT 112 is both observed and stored according to user defined intervals ("collection intervals") which allows for real-time and post-test correlation and presentation of data. In a testing environment, such as the one discussed above, correlating data using timestamps can cause a problem because timestamps often have microsecond precision. The technology disclosed overcomes this issue by allowing the user to define a collection interval when running a test on the DUT 112. The technology disclosed monitors the performance of counter values and/or fact-type values on both the control plane and the data plane during a high data volume test in which the high data volume cannot be recorded at an event level. A high data volume test can encompass data volumes up to, for example, 100 Mbps. The technology disclosed allows a user of the client computer 102 to set the specific time interval (collection interval) for recording the counter values and/or fact-type values from the control plane and the data plane, such as, for example 1 second. This collection interval can be set by the user before the test is implemented on the DUT 112 or during the application of the test on the DUT 112. The interval may also be changed during the test.

During testing of the DUT 112, the IL 206 continuously collects/observes data from the data plane and the control plane, as well as configuration information, and other learned values such as ethernet MAC addresses. This is illustrated in FIG. 7A as a constant stream of observations "0," "0," "0," "1" . . . "1" and "0." Each piece of collected data (fact) has, at least, a value and a timestamp associated therewith. The timestamp identifies the exact time the value of the fact was collected/observed. Because the IL 206 is limited in space, the data collected thereby is transient, meaning that in, for example, a one second collection interval set by the user, a particular fact A1 might have been written and then overwritten multiple times. Note that the IL 206 may obtain data values by either polling registers, reading shared memory, receiving a stream of data at various and varying times and/or other ways apparent to one of skill in the art.

FIG. 7A illustrates the data observed by the IL 206 and FIG. 7B illustrates the storage of the data according to the collection interval. Within a time period of one second the IL 206 may observe 3 or 4 values for a particular fact or counter (see within the first one-second interval, 4 values, a, b, c and d are observed by the IL 206 and in the second one-second interval, 3 values, a, b and c are observed by the IL 206). If a collection interval of 1 second is set by the user for data (fact) collection, then only one data value observed by the IL 206 during that 1 second period is stored in the storage 210.

In this example, fact A will represent "frame_count." As illustrated in FIG. 7A, within the first one-second interval, the IL 206 collects four values represented by a, b, c and d, within the second one-second interval, the IL 206 collects three values, represented by a, b and c, within the third one-second interval, the IL 206 collects four values represented by a, b, c and d and within the fourth one-second interval, the IL 206 collects three values represented by a, b and c. Within the first interval, the IL 206 does not retain all four values for fact A. For example, a particular value is only retained until a new value is received.

However, the BLL 208 can use the user-specified collection interval during the test of the DUT 112 to control and/or store persisting numerous counter values and/or fact-type values on a multitude of data streams to create numerous time series data of the counter values and/or fact-type values, so as to allow for recording of counters from different sources asynchronously at different times. This allows data that is captured at different times by the IL 206 to be correlated to specific time intervals during real-time and/or post-test query. Further, this allows for the correlation of the numerous time series data and test configuration data about, for example, a test state, in specific time intervals. Additionally, using the collection intervals, data can be collected and then later correlated, even if the data comes from sources, such as the testing device 110, the DUT 112, etc. that have imperfectly synchronized time bases. In other words, and as described in further detail below, counter values and/or fact-type values that have different time stamps can be correlated to the same time interval, even when the values come from different sources, such as test configuration data, the testing device 110, the DUT 112, etc. This results in each piece of recorded data (e.g., counter value, fact-type value, etc.) and configuration data being associated with a particular recording time interval.

This is achieved by, for example, while the IL 206 is obtaining values for fact A, the BLL 208, at the one second collection interval set by the user, collecting a value from the IL 206 and storing the value for the fact in a fact table. As illustrated in FIG. 7B, the fact table includes a first value for fact A (e.g., fact A1), such that the value of fact A is collected at the end of the collection interval (note that the technology disclosed is not limited to recording the value at the end of the interval; the value may also be recorded, for example, at the beginning of the interval). Accordingly, the value of fact A1 is 1. The same process follows, such that the value of fact A2 is 2, the value of fact A3 is 2 and the value of fact A4 is 0. This data collection by the BLL 208 continues until the test is finished. The technology disclosed is able to correlate the facts from fact A with other facts, such as fact B, because each value of data has been collected and stored using the collection interval, as illustrated in FIGS. 7A and 7B. As describe above, the testing environment of the technology disclosed may collect hundreds, if not thousands of values within each one second collection interval, where the timestamps of those facts may not exactly line up. However, this problem is overcome because the BLL 208 only stores one value for each fact/counter per collection interval. Note that each interval is not numbered, as illustrated in FIG. 7B—the interval numbering is only for illustrative purposes.

Sometimes recorded values may not have timestamp information associated therewith. For example, configuration information related to the DUT 112 may not include timestamp information because the configuration information is not expected to change over time or during the test. Because the values that do not have timestamp information associated therewith can still be relevant to the test, such values can be treated as dimensional data when storing on storage 210.

A brief summary of the features discussed above with respect to FIGS. 7A and 7B is provided, as follows. A user sets up a one-second collection interval for all facts while running a test on the DUT 112. The test begins. During the test, the IL 206 observes many different fact values during each one-second collection interval. For example, the IL 206 observes many fact values for "frame_count" during each one-second collection interval. The IL 206 keeps updating (replacing) the old fact value for "frame_count" as soon as a new fact value is obtained. The BLL 208 is configured to take a value from the IL 206 at the collection interval specified by the user (e.g., one second). So, for every one-second interval the BLL 208 obtains only one fact value for "frame_count." When the user wants to run a query (either a real-time query as data is still being collected or a post-test query), the user can set the query interval to one second or higher and then data is adjusted accordingly if the query interval is higher than the collection interval.

FIGS. 8A-8C illustrate fact tables for storing values of various facts. The fact table of FIG. 7A is the same as the fact table of FIG. 7B. FIG. 8B illustrates a fact table for fact B and FIG. 6C illustrates a fact table for fact C. Across FIGS. 8A-8C, facts A1, B1 and C1 are stored/collected by the BLL 208 according to the collection interval. While the values of facts A1, B1 and C1 may not have all been obtained at exactly the same time (e.g., the actual timestamps for facts A1, B1 and C1 are not identical), the values of facts A1, B1 and C1 are all collected (from the IL 206) according to the same collection interval by the BLL 208 and then stored in storage 210 accordingly.

Once the data from the test is stored in the storage 210 in one or more result databases, the user can later access (query) the stored data to analyze the results of the test. Continuing with the example above, assume that the collection interval set by the user is one second. The user can design the query at a one-second query interval or the user can design the query using a larger query interval, such as 10 seconds. As a result, there would be 10 values (counter values, fact-type values, etc.) available for each 10 second query, because the collection interval was one second. If the given test has 10 values stored within the 10 second query interval, the technology disclosed is able to average, sum or take the maximum value of the 10 value observations in response to a query.

Figure 9:
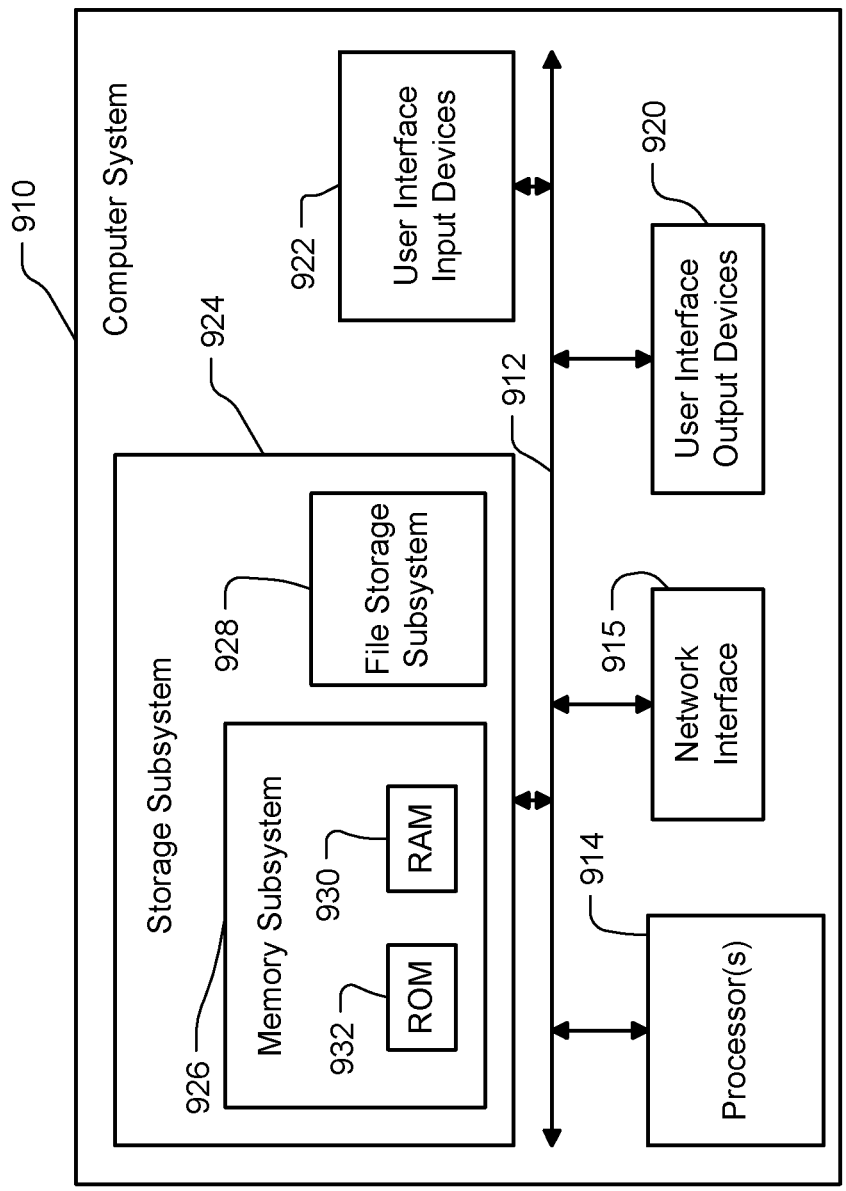
FIG. 9 is a block diagram of an example computer system that can implement various components of the environment of FIG. 1.

FIG. 9 is a block diagram of an example computer system that can implement various components of the testing environment 100 of FIG. 1. Computer system 910 typically includes at least one processor 914, which communicates with a number of peripheral devices via a bus subsystem 912. These peripheral devices may include a storage subsystem 924, comprising for example memory devices and a file storage subsystem, user interface input devices 922, user interface output devices 920, and a network interface 915. The input and output devices allow user interaction with computer system 910. Network interface 915 provides an interface to outside networks, including an interface to the network 120, and is coupled via the network 120 to corresponding interface devices in other computer systems.

User interface input devices 922 may include audio input devices such as speech recognition systems, microphones, and other types of input devices. In general, use of the term "input device" is intended to include all possible types of devices and ways to input speech information into computer system 910 or onto network 120.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein. These software modules are generally executed by processor 914 alone or in combination with other processors.

Memory subsystem 926 used in the storage subsystem can include a number of memories including a main random-access memory (RAM) 930 for storage of instructions and data during program execution and a read only memory (ROM) 932 in which fixed instructions are stored. A file storage subsystem 928 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 928 in the storage subsystem 924, or in other machines accessible by the processor.

Bus subsystem 912 provides a mechanism for letting the various components and subsystems of computer system 910 communicate with each other as intended. Although bus subsystem 912 is shown schematically as a single bus, alternative embodiments of the bus subsystem may use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as a specific example for purposes of illustrating the various embodiments. Many other configurations of computer system 910 are possible having more or fewer components than the computer system depicted in FIG. 9.

Example Query API

An example Query API is provided below that can be implemented by the result service 212 of FIG. 2 to query the result databases on the storage 210 of FIG. 2. The Query API is capable of getting data back out of result databases with as much processing as possible being done service-side. The client computer 102 must first choose what type of query is being performed, single dimension, single result or multi-result. Single dimension means that a single dimension set is selected and provides for slicing, dicing, roll-up and drill-down on the dimensions. Single result means that a single result set and related dimension sets are selected and provides for slicing, dicing, roll-up and drill down on the results. Multi-result means that multiple result sets and related dimension sets are selected in subqueries or nested queries and provides for correlation of multiple results or multi-level aggregation of single results. Further, the Query API defines an expression grammar that is used in all requests (e.g., projections, filters, groups orders). This grammar is similar to the value expression grammar used in SQL, but it is more restrictive and trades power for simplicity. The next effect is that the user is able to focus on just the parts of the query that matter and not the specifics of SQL syntax and structure. Query preparation includes all expressions in the query using the same underlying "value expression" lexer and parser grammars, defined using, for example, Antlr4. Parse trees can be check for both semantic and type correctness. Most query validation errors can be caught by the service itself (e.g., helpful 400 error responses are produced with the expression fragment in the error). Valid trees are interpreted to render raw queries in SQL for PostreSQL. Further, raw queries are heavily cached, such that a same query to a same database will most often use a cached raw query which is useful for queries that need to be run repeatedly for proving live results.

Figure 10A:
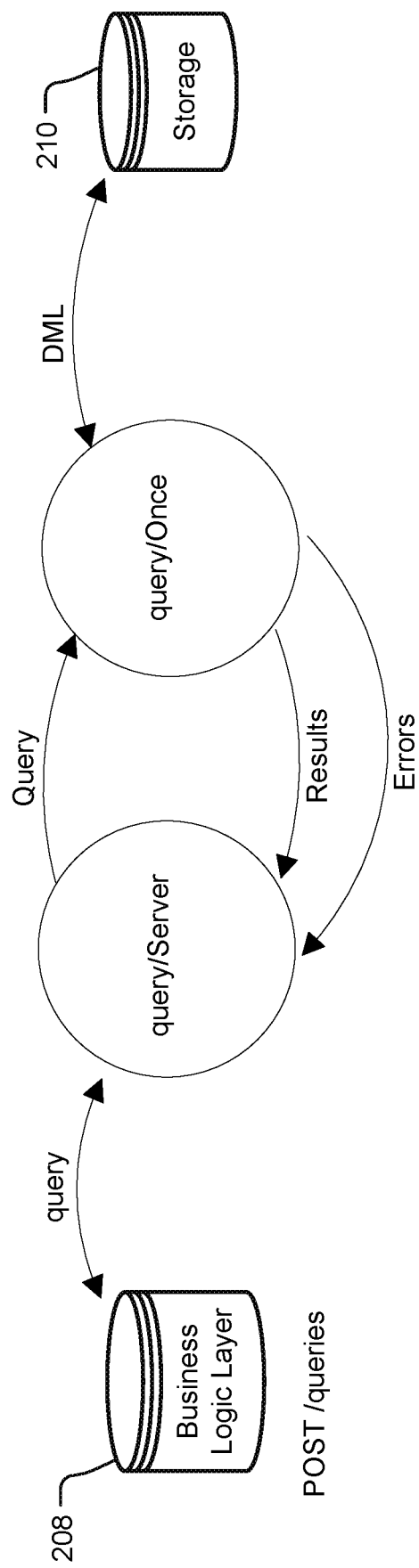
FIGS. 10A, 10B and 10C illustrate different implementations of performing a query from storage.
Figure 10B:
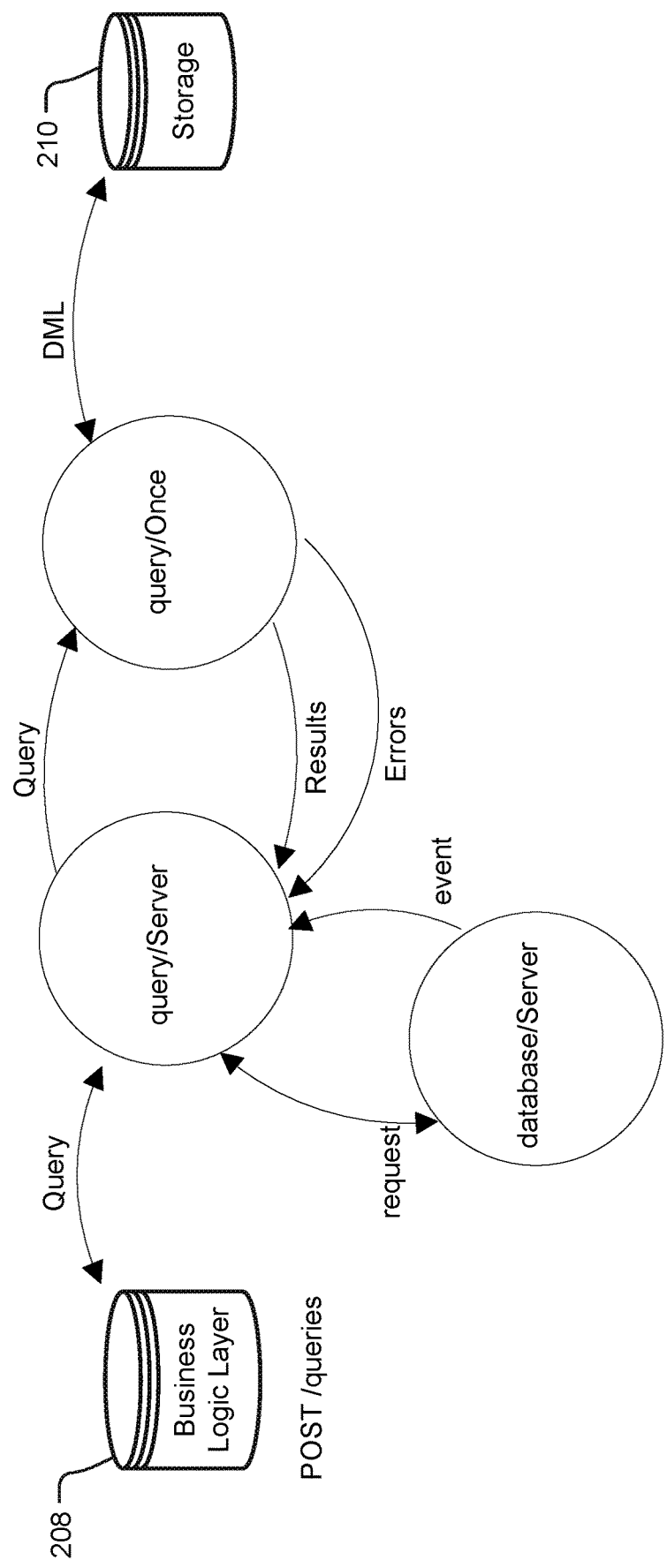
Figure 10C:
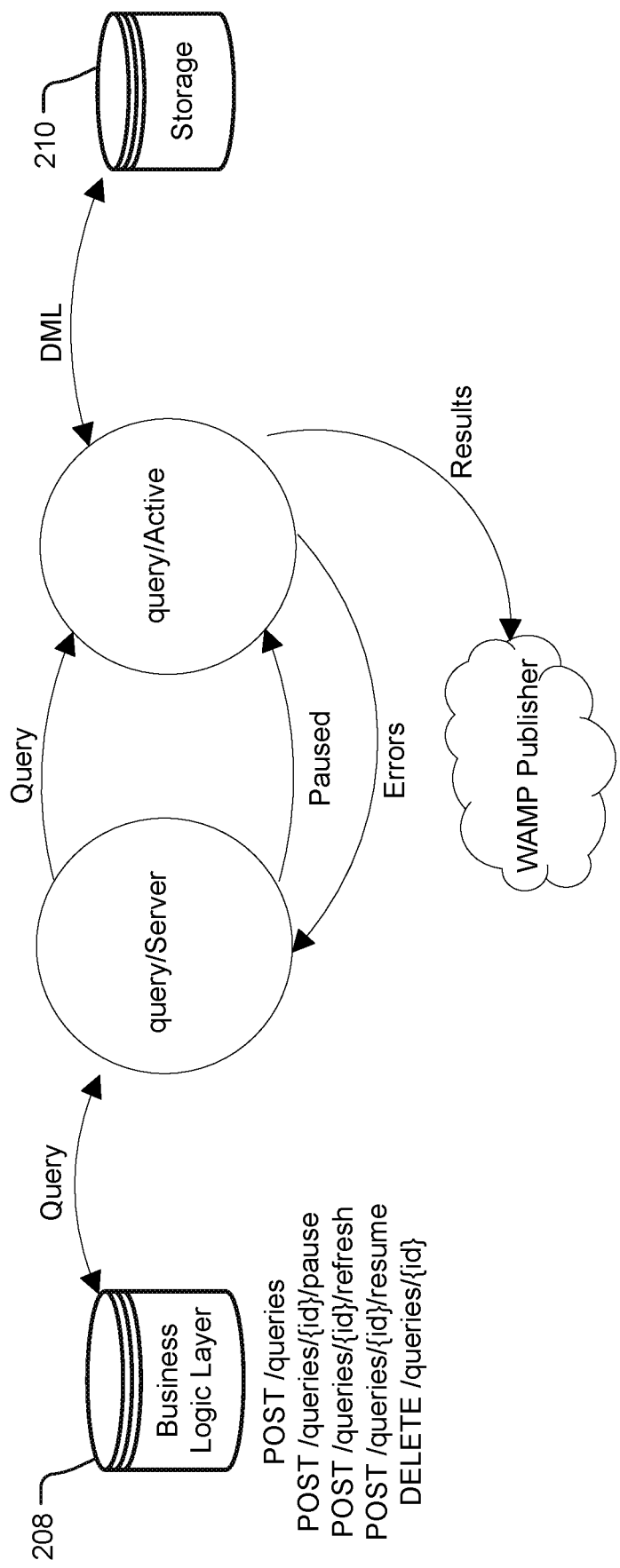

FIGS. 10A, 10B and 10C illustrate different implementations of querying from storage. Specifically, FIG. 10A illustrates a fast path query request in once-mode, FIG. 10B illustrates a slow path query request in once-mode, and FIG. 10C illustrates a fast path query request in active-mode.

Referring to FIG. 10A, an example implementation of using the result service 212 to perform a fast path query in once-mode is illustrated. Specifically, the BLL 208 uses the result service 212 to transmit a query (e.g., POST) to a query server, which in turn initiates a query in once-mode, which in turn initiates a query using, for example, DML to the storage 210. As mentioned above, the database in storage 210 can be a relational database and/or storage 210 can encompass an RDBMS. In response to the query, the results and any errors are returned to the query server and the client computer 102. Some attributes of a fast path query in once-mode include (i) immediately running a raw query if it is in cache, (ii) if raw query is not in cache, then parsing, checking and preparing the query before it is added to the cache for running, (iii) running multiple queries concurrently, and (iv) as soon as results are available they are returned in a response, such as an HTTP response.

Referring to FIG. 10B, an example implementation of using the result service 212 to perform a slow path query request in once-mode is illustrated. Specifically, the BLL 208 uses the result service 212 to transmit a query (e.g., POST) to a query server, which in turn communicates a request to a database server to resolve an unknown database definition (e.g., the database definition is old or there is a "cold start"). Once the database server resolves the unknown database definition, the query server initiates a query in once-mode, which in turn initiates a query using, for example, DML to the storage 210. As mentioned above, the database in storage 210 can be a relational database and/or storage 210 can encompass an RDBMS. Some attributes of a slow path query request in once-mode are that (i) the unknown database definition is revolved by the database server sending an asynchronous request to the database server, (ii) the query for which the database definition is unknown is queued until the database request to the database server is complete and (iii) once the database definition is available, the query can be run in the same manner as the fast path query in once-mode.

Referring to FIG. 10C, an example implementation of using the result service 212 to perform a fast path query request in active-mode is illustrated. Active queries are the same as once-mode queries, except that they run on a client-specified timer. A minimum interval can be set at, for example, one second. A POST response can include a query resource representation, but no results. Further, all query results can be returned to the BLL 208 asynchronously via a Web Application Messaging Protocol (WAMP), for example. Specifically, the BLL 208 uses the result service 212 to transmit query commands (e.g., POST/queries; POST/queries/{id}/pause; POST/queries/{id}/refresh; POST/queries/{id}/resume; and DELETE/queries/{id}) to a query server, which initiates a query in active-mode, which in turn initiates a query using, for example, DML to the storage 210. As mentioned above, the database in storage 210 can be a relational database and/or storage 210 can encompass an RDBMS. In response to the query, the results are returned to a WAMP publisher and any errors are returned to the query server and the BLL 208.

Plan and Cost query modes can also be implemented to return a raw (SQL) query. Plan mode also returns the estimated query plan of the datastore without executing the query and Cost mode also returns the actual query plan of the datastore after executing.

Orion Results Service—Query API
Contents
[Result Database Schema](# result-database-schema)
[Query Types](# query-types)
[Query Results](# query-results)
[Query Pagination](# query-pagination)
[Query Expressions](# query-expressions)
Result Database Schema
Background The Orion Results service's REST API exposes a result database schema that is highly inspired by OLAP-style star schemas. OLAP stands for online analytical processing—a database workload where multi-dimensional data is written in batches, is organized in a schema that is optimized for analytical queries, and then is queried many times. In contrast to OLTP-style—online transaction processing-style—workloads, OLAP data is not usually updated after it is written the first time.

A star schema is traditionally used to store multi-dimensional data in a relational database (RDBMS). Its primary feature is one or more fact tables that reference dimension tables. Fact table columns either contain measurements or metrics (i.e. actual "facts"), or foreign keys to dimension tables. The dimension tables serve to add attributes to the facts, providing a way to filter, group, and label the otherwise unstructured measurements. Dimension attribute columns may be typed as strings, numbers, Booleans, or any other useful data type. Dimension tables usually have many fewer rows than fact tables, but may be much wider so that each fact can be labeled with as many attributes as needed.

OLAP queries consist of three basic analytical operations: roll-up, drill-down, and slicing/dicing. When mapped onto a relational database implementation this is referred to as R-OLAP. Consolidation is performed by SQL aggregates (e.g. 'COUNT' and 'SUM') on fact columns. Drill-down is a query that navigates down through levels of dimension hierarchy to look at details (e.g. drilling down through a stream block dimension to look at a particular stream's measurements). Slicing and dicing is filtering of data (e.g. via 'WHERE' clauses). Other standard and advanced SQL query capabilities can be used as well. For example, basic sorting and row limits can be combined to implement a "Top N" query capability. Advanced aggregates can be useful for calculating percentiles or linear regressions.

Star schemas are often described as denormalized. The nature of this denormalization is that the same attribute value may be repeated in many different dimension rows. Each distinct combination of attribute values requires a new dimension row. As a result, most R-OLAP queries have a simple join structure: a single result table is joined with one or more of its dimension tables.

By architectural principle, the Orion Results service is extensible to support multiple backend datastores. These don't have to be RDBMS-based datastores but it is easiest to discuss the implementation in those terms so that is the convention used throughout the remainder of this document.

Result Sets (or: Fact Tables)

In its REST API specification, the Orion Results service refers to fact tables as "Result Sets" (somewhat hiding the fact that there is even an RDBMS under the hood, as this might not always be the case). Each Result Set has a name and consists of one or more facts. Each fact in turn has a name and data type. Fact data types include: timestamp, event, integer, number, Boolean, string, and inet.

Because all results are inherently time-series data, each Result Set automatically includes one and only one timestamp-typed fact (named 'timestamp').

Event-typed facts are meant to record that an event occurred. Conceptually they are a single bit field with a '1' signaling that the event occurred with a '0' recorded otherwise. The name of the fact conveys the event's meaning.

In the underlying RDBMS fact table definition, each fact is a separate column with data types chosen as appropriate. All fact columns except 'timestamp' allow nulls. A null value is understood to mean "no data". Measured zero values are explicitly recorded.

We can make a few generalizations about RDBMS fact column data types: (i) Timestamps are normalized to UTC during writes. If no time zone is provided by the client, UTC is assumed. Timestamps are always interpreted as ISO8601 values. Timestamp sub-second resolution is typically available down to the microsecond level; (ii) Event fact columns may be typed as a bit field or as a Boolean, depending on the RDBMS; (iii) Integer fact columns are wide enough to hold 64-bit signed integer values; (iv) Numeric fact columns are arbitrary-precision floating point values. Precision varies with the choice of the RDBMS but minimally allow for values that are at least 34 digits wide containing 15 decimal digits; (v) String fact columns can store arbitrarily-long values using UTF-8 encoding; and (vi) Inet fact columns may not have direct implementations in all RDBMS backends. If not, these values are stored as strings. Otherwise the data type is capable of storing IPv4 and IPv6 addresses and optionally their subnet, e.g. '10.1.1.1/8'. If the subnet mask is missing it is assumed to be '/32' for IPv4 and '/128' for IPv6, so the address is implicitly a host address.

In the REST API specification, each Result Set is described by zero or more Dimension Sets. Likewise, the fact table has one foreign key column per Dimension Set. For performance reasons, foreign key constraints are not used. Instead, the burden of referential integrity is placed on the writer client. The obvious downside is that the RDBMS cannot guarantee data integrity. But there are other upsides in addition to increased write performance. The lack of constraints means that if the domain requires/allows it, then facts and dimensions can be written independently of each other and in any order. With Spirent TestCenter results, the domain requires this (particularly for stream blocks and their dimensions) and we can allow it as long as writer client implementations are reasonably performant.

Each Result Set may optionally designate one of its Dimension Sets as the "Primary Dimension Set". This is usually the Dimension Set that has the identity value for the Result Set, e.g. the port for port-based statistics, or the transmit stream for transmit stream statistics. Designation of the Primary Dimension Set is not required, but when it exists it should be specified. For example, its presence enables the 'last' materialized view defined below.

In an RDBMS implementation, typically an index covers each dimension key column of each fact table for fast slice and dice operations.

Fact tables are created without primary keys as there is no need to refer to individual rows in a Result Set.

Dimension Sets (or: Dimension Tables)

Similar to the relationship between Result Sets and fact tables, the REST API defines Dimension Sets which are created as dimension tables in the RDBMS. Each Dimension Set has a name and one or more attributes. Each attribute in turn has a name and data type. Attributes support the same data types as facts.

Each Dimension Set automatically includes an integer-typed attribute named 'key'. In the underlying RDBMS dimension table this is used as the primary key column, so each 'key' value must be unique. As a reminder, the choice of 'key' values is a writer client concern. It is the client's responsibility to maintain the integrity of the Result Set to Dimension Set references. Multiple Result Sets may reference the same Dimension Set. This is expected and desirable in many cases.

Each attribute is a separate column with data types chosen as appropriate. All attribute columns except 'key' allow nulls. A null value is understood to mean "no attribute"

Naming Constraints

In the Orion Results REST API specification, the following names are all constrained to 40 characters or less: (i) Result Sets (fact tables); (ii) Dimension Sets (dimension tables and fact table foreign key columns); (iii) Sub-query aliases (from nested sub-queries in Multi Result query definitions).

Other names are constrained to 63 characters or less: (i) Facts (fact table columns); and (ii) Attributes (dimension table columns).

All names must start with a lower case letter ('a'-'z'). Subsequent characters may be any combination of lower case letters, digits ('0'-'9'), and underscores ('_'). No other characters are allowed.

Result Set and Dimension Set names must be distinct within a result database. Fact names and attribute names must be distinct within a Result Set or Dimension Set, respectively. Sub-query aliases must be distinct within a query definition.

These constraints serve several purposes: (i) These names are "safe" to use as the basis for table and column names. The same names used in the API are visible to clients that connect directly to the RDBMS; (ii) Qualified names of the form 'result_set.fact' or 'dimension_set.attribute' can be used in query definitions and naturally map to 'table.column' names in SQL statements (note that actual SQL table names will have to additionally include a suffix in order to make them distinct within the RDBMS); (iii) Qualified names of the form 'alias.column' can be used in query definitions and naturally map to sub-query names in SQL statements; (iv) Some RDBMS systems are case sensitive and others aren't. Lower casing names eliminates potential confusion regarding case-sensitivity; and (v) Lack of punctuation characters like allow those to be used in expressions as defined below.

Query Types

The Orion Result service supports four query types for production use. The choice of query type is the first, and most important, consideration for a client. Each query type has a different purpose:

| Type | Selects | Purpose |
| --- | --- | --- |
| Single Dimension | Single Dimension Set | Slicing, dicing, roll-up, and drill-down on dimensions |
| Single Result | Single Result Set | Slicing, dicing, roll-up, and drill-down on results |
| Multi Result | Multiple Result Sets | Correlation of results |
| Delete Result | Single Result Set | Deletion of selection result |

The service's query API is organized around these query types. Instead of exposing the backend datastore's query language and forcing the client to compose a valid query, the API asks the client to choose a query type first. Then, based on the query type, only a necessary set of expressions and parameters must be provided. These are written in a datastore-independent expression grammar. This makes the API easier to use and also greatly reduces the number of invalid queries that can be constructed.

For illustration purposes, the following example Result Database schema is used throughout the rest of this section:
    <img     src="orion-res-query-example-schema.png" width="640">

In this database there are two Result Sets ('tx_stream_stats' and 'rx_stream_stats') sharing a Dimension Set ('stream_block'). Each Result Set is additionally described by its own Dimension Set ('tx_stream' and 'rx_stream').

Single Dimension Query Type

The Single Dimension query type is used to slice, dice, roll-up, and drill-down on dimension values themselves. It may only reference a single Dimension Set.

Projections: '[value expression AS name]'
Filters: '[boolean_value_expression]'
Groups: '[value_expression]'
Orders: '[value_expression ASC|DESC]'
Limit: 'count' (defaults to all if omitted)
Pagination: 'mode' and 'cursor'

For example, this query retrieves the first 100 transmit stream dimension values where the IPv4 destination address is multicast:

```
{
    "single_dimension": {
        "projections": [
            "tx_stream.key",
            "tx_stream.stream_id",
            "tx_stream.ipv4_src_addr",
            "tx_stream.ipv4_dst_addr",
            "tx_stream.eth2_src_mac",
            "tx_stream.eth2_dst_mac"
        ],
        "filters": [
            "tx_stream.ipv4_dst_addr << '224.0.0.0/4'"
        ],
        "orders": [
            "tx_stream.ipv4_dst_addr"
        ],
        "limit": 100,
        "pagination": {
            "mode": "forward"
        }
    }
}
```

Note that the projection, filter, and order expressions use fully-qualified names. Since this is a Single Dimension query it would be an error to refer to more than one Dimension Set name in these expressions. Orders default to ascending if not specified. The English pronunciation of that particular filter expression is "tx_stream.ipv4_dst_addr is contained by the 224.0.0.0/4 subnet". Special inet-type operators and functions are defined below.

Because pagination was requested, this query result will return an encoded cursor value that may be used in subsequent requests to retrieve the next page of values:

```
{
    "single_dimension": {
        ... [as before] ...
        "limit": 100,
        "pagination": {
            "mode": "forward",
            "cursor": "<cursor value from previous query result>"
        }
    }
}
```

As a related example, this Single Dimension query rolls-up (counts) the number of IPv4 destination addresses per subnet per transmit stream:

```
{
    "single_dimension": {
        "projections": [
            "tx_stream.stream_id",
            "network(tx_stream.ipv4_dst_addr) as destination_subnet",
            "count(tx_stream.ipv4_dst_addr) as destination_address_count"
        ],
        "groups": [
            "tx_stream.stream_id",
            "network(tx_stream.ipv4_dst_addr)"
        ],
        "orders": [
            "tx_stream.stream_id",
            "network(tx_stream.ipv4_dst_addr)"
        ]
    }
}
```

In this query, a couple of result columns are explicitly named. Also, as is typical for queries where grouping is used, ungrouped values in projection and order expressions must use aggregate functions.

Single Result Query Type

The Single Result query type is used to slice, dice, roll-up, and drill-down on results. It may only reference a single Result Set but may also reference any number of related Dimension Sets. Since Result Sets always contain time series data, this query type includes additional optional controls over timestamp range:

Projections: '[value_expression AS name]'
Filters: '[boolean_value_expression]'
Groups: '[value_expression]'
Orders: '[value_expression ASC|DESC]'
Timestamp range: 'absolute' or 'relative' (defaults to all timestamps if omitted)
Limit: 'count' (defaults to all if omitted)
Pagination: 'mode' and 'cursor'

For example, to return a particular stream block's transmit stats over an absolute timestamp range:

```
{
    "single_result": {
        "projections": [
            "tx_stream_stats.timestamp",
            "stream_block.name",
            "tx_stream_stats.frame_rate",
            "tx_stream_stats.byte_rate"
        ],
        "filters": [
            "stream_block.name = 'streamblock 1'"
        ],
        "orders": [
            "tx_stream_stats.timestamp",
            "tx_stream.stream_id"
        ],
        "timestamp_range": {
            "absolute": {
                "start": "2017-05-23T13:00:00",
                "end": "2017-05-23T13:00:01"
            }
        }
    }
}
```

The projection, filter, and order expressions reference both facts and dimensions but the overall constraint of referencing a single Result Set ('tx_stream_stats') and related Dimension Sets ('stream_block' and 'tx_stream') is maintained.

Since there are multiple streams' worth of data in this query result, we're ordering the results based on timestamp first, and stream id second. Finally, this query drills down on a particular minute's worth of result data in addition to isolating a particular stream_block by name.

This example returns "raw results" in the sense that whatever facts are available within the timestamp range are returned as-is. But let's say we want to look back over a longer time period and summarize results into one-minute intervals.

The Single Result query can still handle this:

```
{
  "single_result": {
    "projections": [
      "interval(tx_stream_stats.timestamp, 'PT1M') as interval",
      "tx_stream.stream_id",
      "avg(tx_stream_stats.frame_rate) as frame_rate",
      "avg(tx_stream_stats.byte_rate) as byte_rate"
    ],
    "filters": [
      "stream_block.name = 'streamblock 1'"
    ],
    "groups": [
      "interval(tx_stream_stats.timestamp, 'PT1M')",
      "tx_stream.stream_id"
    ],
    "orders": [
      "interval(tx_stream_stats.timestamp, 'PT1M')"
    ],
    "timestamp_range": {
      "relative": {
        "interval": "PT1H"
      }
    }
  }
}
```

Here we're looking back over the last hours' worth of data and summarizing each transmit streams' frame/byte rate at one-minute intervals. Result timestamps are simply truncated to the minute in order to form each interval. If there are multiple results for a single stream within any distinct one-minute interval then those facts are averaged (based on the use of the 'avg' aggregate).

Multi Result Query Type

The Multi Result query type extends the Single Result query type and is generally used when results from multiple Result Sets need to be correlated or combined to produce a single result. This query type is structured around sub-queries, which add both complexity and power.

The query definition looks familiar:
Subqueries: '[subquery]'
Projections: '[value_expression AS name]'
Filters: '[boolean_value_expression]'
Groups: '[value_expression]'
Orders: '[value_expression ASC|DESC]'
Limit: 'count' (defaults to all if omitted)
Pagination: 'mode' and 'cursor'

What's new here is the concept of sub-query. For conceptual purposes, the Multi Result query type forms a tree, with the query definition shown above as the root node and sub-queries as the children nodes. Each sub-query has its own definition:
Alias: 'name'
Subqueries: '[subquery]'
Projections: '[value_expression AS name]'
Filters: '[boolean_value_expression]'
Groups: '[value_expression]'
Orders: '[value_expression ASC|DESC]'
Timestamp range: 'absolute' or 'relative' (defaults to all timestamps if omitted)
Limit: 'count' (defaults to all if omitted)

This also looks familiar. Each sub-query is given an alias so that its results can be referred to by its parent. Sub-queries may also include their own sub-queries, allowing for construction of an arbitrarily deep tree.

In general, each sub-query node may:
Nest additional sub-queries. In this sense it is an "internal node" in the query tree. Qualified names used in internal node expressions are scoped to results produced by immediate child sub-queries. Qualified names use child sub-query aliases instead of Result or Dimension Set names.

Reference a single Result Set and related Dimension Sets, in which case the sub-query is a "leaf node" in the query tree (i.e. cannot nest any additional sub-queries). Qualified names used in leaf node expressions reference Result Set facts and Dimension Set attributes as usual.

Note that in the second bullet above, each sub-query is functioning like its own Single Result query.

When multiple child sub-queries exist at any level of the query tree, the parent will return every combination of the childrens' results (i.e. their Cartesian product) unless these are joined using a filter expression. When a filter expression is used to join sub-query results then only matching results are returned (i.e. an inner join is performed).

Because it is flexible and open-ended, this query type can be difficult to understand. Two examples are shown below.

In the first example we want to take the transmit frame rate for each stream block and subtract the receive frame rate for the same block to get a frame loss rate. Since transmit and receive stream stats are stored in two different Result Sets ('tx_stream_stats' and 'rx_stream_stats'), we have to use a Multi Result query to get a single query result with this calculation. Two sub-queries are required, the first to roll-up transmit stream stats, and the second to roll-up receive stream stats. A top-level query projection handles the difference between these two:

```
{
  "multi_result": {
    "subqueries": [
      {
        "alias": "q1",
        "projections": [
          "stream_block.key as stream_block_key",
          "stream_block.name as stream_block_name",
          "sum(tx_stream_stats$last.frame_rate) as tx_frame_rate"
        ],
        "groups": [
          "stream_block.key",
          "stream_block.name"
        ]
      },
      {
        "alias": "q2",
        "projections": [
          "stream_block.key as stream_block_key",
          "stream_block.name as stream_block_name",
          "sum(rx_stream_stats$last.frame_rate) as rx_frame_rate"
        ],
        "groups": [
          "stream_block.key",
          "stream_block.name"
        ]
      }
    ],
    "projections": [
      "q1.stream_block_name",
      "q1.tx_frame_rate - q2.rx_frame_rate as frame_loss_rate"
    ],
    "filters": [
      "q1.stream_block_key = q2.stream_block_key"
    ],
    "orders": [
      "q1.stream_block_key"
    ]
  }
}
```

Note that the two sub-queries are given aliases 'q1' and 'q2'. As long as aliases obey the naming constraints described above the actual choice of name doesn't matter.

Whatever is chosen should be unambiguous versus Result Set and Dimension Set names or the query may produce an error.

The top-level projection performs a simple subtraction of each sub-query's result. The filter expression joins sub-query results by stream block. It wouldn't make any sense to subtract result from different stream blocks.

Here is the same query laid out in tree form:

<img src="orion-res-query-example-1.png" width="800">

In this diagram you can see that the sub-queries are summing transmit and receive stream stats (using the 'last' materialized view for each) into per-stream block totals and then "pushing" these results up to the top-level node which takes their difference.

This first example calculates a single loss value per stream block using the last result for each stream. This produces a result that might be suitable for a table view. But what if we wanted to see a time series of this data for a chart view?

We can look back over time using a timestamp range. But the reality is that stream stat results are recorded with different timestamps. We need to look at these on a per-interval basis. As with the earlier example of a Single Result query, we'll use one-minute intervals and average results within any given one-minute interval.

How should we structure this query? Let's think about it in terms of how we'd do it imperatively in code: (i). For each stream in each one-minute interval, average multiple transmit/receive stats into a single set of transmit/receive stats for that stream/interval; (ii) Then, for each stream in each one-minute interval, sum up transmit/receive stats into a set of transmit/receive stream block stats for that interval; and (iii) Finally, for each stream block in each one-minute interval, subtract the receive stats from the transmit stats.

This leaves us with one value per stream block per one-minute interval, one time series per stream block. We could put that on a chart. The Multi Result query we need to write will have this exact same structure. The first step above becomes the leaf nodes at the bottom of the query tree (see 'q1_1' and 'q2_1' below). These sub-queries handle averaging multiple results, and we need one each for transmit and receive. The next layer of the query tree handles the second step of summing into stream block stats ('q1' and 'q2' below). Again, we need one sub-query for transmit, and one for receive. The root of the query tree handles the third step where the difference is calculated:

```
{
  "multi_result": {
    "subqueries": [
      {
        "alias": "q1",
        "subqueries": [
          {
            "alias": "q1_1",
            "projections": [
              "interval(tx_stream_stats.timestamp, 'PT1M') as interval",
              "stream_block.name as stream_block_name",
              "tx_stream.key as tx_stream_key",
              "avg(tx_stream_stats.frame_rate) as tx_frame_rate"
            ],
            "groups": [
              "interval(tx_stream_stats.timestamp, 'PT1M')",
              "stream_block.name",
              "tx_stream.key"
            ],
            "timestamp_range": {
              "relative": {
                "interval": "PT1H"
              }
            }
          }
        ],
        "projections": [
          "q1_1.interval as interval",
          "q1_1.stream_block_name as stream_block_name",
          "sum(q1_1.tx_frame_rate) as tx_frame_rate"
        ],
        "groups": [
          "q1_1.interval",
          "q1_1.stream_block_name"
        ]
      },
      {
        "alias": "q2",
        "subqueries": [
          {
            "alias": "q2_1",
            "projections": [
              "interval(rx_stream_stats.timestamp, 'PT1M') as interval",
              "stream_block.name as stream_block_name",
              "rx_stream.key as rx_stream_key",
              "avg(rx_stream_stats.frame_rate) as rx_frame_rate"
            ],
            "groups": [
              "interval(rx_stream_stats.timestamp, 'PT1M')",
              "stream_block.name",
              "rx_stream.key"
            ],
            "timestamp_range": {
              "relative": {
                "interval": "PT1H"
              }
            }
          }
        ],
        "projections": [
          "q2_1.interval",
          "q2_1.stream_block_name",
          "sum(q2_1.rx_frame_rate) as rx_frame_rate"
        ],
        "groups": [
          "q2_1.interval",
          "q2_1.stream_block_name"
        ]
      }
    ],
    "projections": [
      "q1.interval as interval",
      "q1.stream_block_name as stream_block_name",
      "q1.tx_frame_rate - q2.rx_frame_rate as frame_loss_rate"
    ],
    "filters": [
      "q1.interval = q2.interval",
      "q1.stream_block_name = q2.stream_block_name"
    ],
    "orders": [
      "q1.interval"
    ]
  }
}
```

Besides the structure, there are a few other interesting things to note about this query:

Each of the leaf node sub-queries ('q1_1' and 'q2_1') has the same relative timestamp range (we're looking back over the last hours' worth of stats). In this case it wouldn't make sense to use different ranges per sub-query, but note that the specification of timestamp range is duplicated in each of the sub-queries. These two sub-queries are acting independently when they process transmit and receive stream stats.

The 'interval' function is used to truncate timestamps into one-minute intervals. We include this in both the group list (to get per-interval aggregations) as well as the projection list (to keep track of what interval we're dealing with). This pairing is visible in the leaf nodes and is carried all the way to the root. Likewise, for the stream block names.

The filter expressions at the top of the query tree join sub-query results (from 'q1' and 'q2') by both interval AND stream block. This is necessary because we only want to perform the subtraction for values from the same interval and the same stream block.

Here is the second example laid out in tree form:
<img src="orion-res-query-example-2.png" width="800">

In this diagram you can see the same structure that is described above. Notice that the middle layer is just performing an additional level of roll-up (summing by stream block) on the query results coming from the bottom layer. The results get "thinner" as they move up the tree.

Also note that both 'q1' and 'q2' have a single child sub-query. Each internal node of the query tree has to have at least one child sub-query, but there is no requirement that they have two or more.

Delete Result Query Type

Unlike other query types, the Delete Result query doesn't actually return data. Instead, this query type deletes its selected results. It acts on a single Result Set but may also reference any number of related Dimension Sets in order to scope the delete operation. Since Result Sets always contain time series data, this query type also includes additional optional controls over timestamp range:

Filters: '[boolean_value_expression]'

Timestamp range: 'absolute' or 'relative' (defaults to all timestamps if omitted)

For example, to delete a particular stream block's transmit stats that are older than 15 minutes:

```
{
  "delete_result": {
    "name": "tx_stream_stats",
    "filters": [
      "stream_block.name = 'streamblock 1'"
    ],
    "timestamp_range": {
      "relative": {
        "interval": "-PT15M"
      }
    }
  }
}
```

Filter expressions may reference both facts and dimensions as long as the overall constraint of referencing a single Result Set and related Dimension Sets is maintained.

Note that the relative timestamp range is negated. If this was 'PT15M' the query would delete the last 15 minutes' worth of stream stats. By negating this value, the query deletes everything_except_the last 15 minutes' of stats.

This query type always returns a single column ('count') and one row of data with a value indicating the number of rows actually deleted. This count may be zero.

Note that regardless of filter expressions and timestamp ranges, results that are present in materialized views (e.g. the 'last' materialized view) will not be deleted by this query type.

Query Results

Query results are returned in table format. Each table consists of an array of column names and an array of row value arrays (i.e. a two-dimensional array). Column names are determined as follows:

If names are given in a projection expression (e.g. 'as foo'), that name is used.

If a single qualified name is used in a projection expression, the attribute or fact portion of this name is used. Otherwise, a column name is auto-generated.

If clients are sensitive to the choice of column names then names should be explicitly provided in all projection expressions.

Columns are always returned in the same order as projection expressions.

Row value arrays have the same length as the column name array. Row values may be returned in any order unless order expressions are provided in query definitions.

If the query was paginated, the result includes an encoded cursor value that may be used in subsequent queries to page forward or backward.

Query Pagination

Query pagination is supported for the Single Dimension, Single Result, and Multi Result query types, subject to several constraints:

The query definition must include at least one expression in 'orders'. This ensures that result rows will have a defined order, which is in turn required to implement a paging mechanism.

In addition, the expressions defined in 'orders' must establish a [total order](e.g., https://en.wikipedia.org/wiki/Total_order) over the query result. In plain English, this means that every query result row must be comparable using the order expressions, and there must be no ambiguity in this sort ordering. If this condition is violated, then query result data may be dropped during paging.

The query definition must include a 'limit' value greater than or equal to one. This determines the page size.

Pagination is performed relative to a cursor value. Each cursor value encodes information about the first and last row of a given query result (i.e. a given page). When forward paging is requested, the next result will begin with the row that occurs immediately after (in sort order) the last row of the previous page and then proceed in sort order. Likewise, when backward paging is requested, the next result will begin with the row that occurs immediately before (in sort order) the first row of the previous page and then proceed in_reverse_sort order.

This paging approach is sometimes referred to as "keyset pagination" and cleanly handles insertion of new rows anywhere in the dataset without creating discontinuities.

We can define pagination behavior for all boundary conditions:

Forward pagination without a cursor value returns the first page of results.

Backward pagination without a cursor value returns the last page of results.

When paging in any direction, if there are fewer than 'limit' rows but at least one row available, then a valid query result is returned with as many rows as possible.

Forward pagination at the last page of a result (i.e. no subsequent rows) returns a valid query result with no rows and the same cursor value.

Backward pagination at the first page of a result (i.e. no previous rows) returns a valid query result with no rows and the same cursor value.

Query Expressions

Value Expression Grammar

Value expressions are the "building block" for all expressions used in query definitions: projections, filters, groups, and orders. Value expressions are defined by the grammar shown below.

In this grammar, alternatives are chosen left to right. For example, in the 'expr' rule, the multiplication binary operator has higher precedence than division, which in turn has higher precedence than addition. All operators associate left to right, with the exception of exponentiation which associates right to left (i.e. '2+3+4=(2+3)+4' but '2^3^4=2^(3^4)').

Tokens are not case sensitive. For example, both 'AND' and 'and' are allowed. Whitespace characters (spaces, tabs, carriage returns, and newlines) are ignored.

This is a simplified version of the actual grammar. See the complete set of Antlr4 grammars for reference.

```
expr
    : literal
    | anyName ('$' anyName)? '.' anyName
    | ('-' | '+' | '@' | NOT ) expr
    | expr '^' expr
    | expr ( '*' | '/' | '%' ) expr
    | expr ( '+' | '-' ) expr
    | expr ( '<<' | '<<=' | '>>' | '>>=' ) expr
    | expr ( '<' | '<=' | '>' | '>=' ) expr
    | expr ( '=' | '==' | '!=' | '<>') expr
    | expr ( AND | OR ) expr
    | IDENT '(' ( expr ( ',' expr )* )? ')'
    | '(' expr ')'
    ;
literal
    : DECIMAL_NUMBER
    | OCTAL_NUMBER
    | HEX_NUMBER
    | FLOAT_NUMBER
    | STRING
    | TRUE
    | FALSE
    ;
anyName
    : IDENT
    | keyword
    ;
keyword
    : AND
    | AS
    | ASC
    | DESC
    | FALSE
    | NOT
    | OR
    | TRUE
    ;
IDENT
    : LETTER ( LETTER | DECIMAL_DIGIT | '_' )*
    ;
DECIMAL_NUMBER
    : [1-9] DECIMAL_DIGIT*
    ;
HEX_NUMBER
    : '0' ( 'x' | 'X' ) HEX_DIGIT+
    ;
OCTAL_NUMBER
    : '0' OCTAL_DIGIT+
    ;
FLOAT_NUMBER
    : DECIMAL_DIGIT+ '.' ( DECIMAL_DIGIT+ )? EXPONENT?
    | DECIMAL_DIGIT+ EXPONENT?
    | '.' DECIMAL_DIGIT+ EXPONENT?
    ;
EXPONENT
    : ( 'e' | 'E' ) ( '+' | '-' )? DECIMAL_DIGIT+
    ;
STRING
    : '"' ( ~'/' | '\"' )* '"'
    ;
LETTER
    : [a-zA-Z]
    ;
DECIMAL_DIGIT
    : [0-9]
    ;
HEX_DIGIT
    : [0-9a-fA-F]
    ;
OCTAL_DIGIT
    : [0-7]
    ;
```

Qualified Name References and Materialized Views

Result Set facts and Dimension Set attributes are referenced using the following syntax: (i) result_set.fact; and (ii) dimension_set.attribute.

To increase query performance materialized views may be maintained for some Result Sets. To access a Result Set through a materialized view, an alternate syntax is used that includes the view name: result_set$view.fact Currently, the only materialized view is the 'last' view. This view contains a single result value that is the last result value (by 'timestamp') for any identity. This view is only available when a Result Set specifies a Primary Dimension Set. The Primary Dimension Set key is used as the result value's identity.

For example, to reference the last frame_count per receive stream, use: rx_stream_stats$last.frame_count.

When sub-queries are in use, their results are referenced using the same syntax: alias.name.

Due to this convention, all projection expressions in all sub-queries must explicitly name their results.

Arithmetic Operators

Arithmetic operators are available for timestamp, integer, and numeric-typed values. Timestamp-typed values are automatically coerced to POSIX time values (i.e. numeric-typed seconds) when used in arithmetic expressions.

In order of decreasing precedence:

| Operator | Description | Example | Result |
|---|---|---|---|
| '@' | absolute value | '@ −5' | '5' |
| '^' | exponentiation | '2 ^ 3' | '8' |
| '*' | multiplication | '2 * 3' | '6' |
| '/' | division | '4 / 2' | '2' |
| '%' | modulo | '5 % 4' | '1' |
| '+' | addition | '2 + 3' | '5' |
| '−' | subtraction | '3 − 2' | '1' |

All operators are binary (except for '@', which is unary) and associate left to right (except for '^', which associates right to left).

Note that division by zero produces a null result rather than an error.

Comparison Operators

Comparison operators are available for all values:

| Operator | Description |
|---|---|
| '<' | less than |
| '<=' | less than or equal to |
| '>' | greater than |
| '>=' | greater than or equal to |
| '=' or '==' | equal to |
| '!=' or '<>' | not equal to |

Additional comparison operators are available for string-typed values. All string comparisons are performed in a case-insensitive manner:

| Operator | Description |
| --- | --- |
| '<<' | is contained by |
| '>>' | contains |

Additional comparison operators are available for inet-typed values:

| Operator | Description |
| --- | --- |
| '<<' | is contained by |
| '<<=' | is contained by or equals |
| '>>' | contains |
| '>>=' | contains or equals |

Logical Operators

Logical operators are available for all Boolean and event-typed values, with special consideration for null values:

| 'a' | 'b' | 'a AND b' | 'a OR b' |
| --- | --- | --- | --- |
| 'TRUE' | 'TRUE' | 'TRUE' | 'TRUE' |
| 'TRUE' | FALSE | FALSE | 'TRUE' |
| 'TRUE' | NULL | NULL | 'TRUE' |
| FALSE | FALSE | FALSE | FALSE |
| FALSE | NULL | FALSE | NULL |
| NULL | NULL | NULL | NULL |

| 'a' | 'NOT a' |
| --- | --- |
| 'TRUE' | FALSE |
| FALSE | 'TRUE' |
| NULL | NULL |

Aggregate Functions

Aggregate functions compute a single value from a set of input values. They are generally used whenever grouping is active in a query:

| Function | Input Types | Output Type | Description |
| --- | --- | --- | --- |
| 'any(expr)' | Boolean or event | Boolean | 'true' if at least one input value is 'true' |
| 'avg(expr)' | integer or numeric | numeric | arithmetic mean of all non-null input values |
| 'count(expr)' | any | integer | count of the number of non-null input values |
| 'every(expr)' | Boolean or event | Boolean | 'true' if all input values are 'true' |
| 'min(expr)' | integer, numeric, timestamp, or inet | same as input type | minimum value across all non-null input values |
| 'max(expr)' | integer, numeric, timestamp, or inet | same as input type | maximum value across all non-null input values |
| 'sum(expr)' | integer or numeric | same as input type | summation of all non-null input values |

Additional functions are available for limited statistical analysis:

| Function | Return Type | Output Type | Description |
| --- | --- | --- | --- |
| 'percentile(expr, fraction)' | integer or numeric | numeric | returns the first input value whose position in the ordering equals or exceeds the specified fraction |
| 'regr_slope(y_expr, x_expr)' | integer, numeric, or timestamp | numeric | slope of the least-squares fit linear equation determined by (y_expr, x_expr) pairs |
| 'regr_intercept(y_expr, x_expr)' | integer, numeric, or timestamp | numeric | y-intercept of the least-squares fit linear equation determined by (y_expr, x_expr) pairs |
| 'regr_r2(y_expr, x_expr)' | integer, numeric, or timestamp | numeric | square of the correlation coefficient |

Interval Function

An additional function is defined to operate on timestamp-typed values:

| Function | Return Type | Description | Example | Returns |
| --- | --- | --- | --- | --- |
| 'interval (timestamp, duration)' | timestamp | truncate timestamp to nearest interval | 'interval('2017-05-23T13:00:24.854594', 'PT15S')' | '2017-05-23T13:00:15' |

Interval durations are given in ISO8601 format.
Inet Functions
A special family of functions are defined to operate on inet-typed values:

| Function | Return Type | Description | Example | Returns |
|---|---|---|---|---|
| 'broadcast(inet)' | inet | broadcast address for network | 'broadcast('192.168.1.5/24')' | '192.168.1.255/24' |
| 'family(inet)' | integer | address family | 'family('::1')' | '6' |
| 'host(inet)' | string | extract IP address | 'host('192.168.1.5/24')' | '192.168.1.5' |
| 'masklen(inet)' | integer | extract netmask length | 'masklen('192.168.1.5/24')' | '24' |
| 'network(inet)' | inet | extract network part of address | 'network('192.168.1.5/24')' | '192.168.1.0/24' |

Projection Expressions
Projection expressions define the contents of query result columns. They extend the value expression grammar in a simple way:

```
start
    : expr ( AS anyName )?
    ;
```

That is, each projection expression is a value expression, and is optionally given an alias—automatically used as the column name—in the query result.
Filter Expressions
Filter expressions are simply value expressions. These must produce a Boolean-typed value.
Group Expressions
Group expressions are simply value expressions. They may produce any type value.
Order Expressions
Order expressions control the order of query result rows. They also extend the value expression grammar in a simple way:

```
start
    : expr (ASC | DESC )?
    ;
```

If sort order is not specified, it defaults to 'ASC'.
Some Particular Implementations
We describe various implementations for correlating results obtained from running a test on a DUT.
The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.
A method of efficiently monitoring performance counters of a device under test (DUT) during a high data volume test having data event volumes that cannot be recorded at an event level is provided. The method can include specifying a time interval for recording counters on data planes and control planes and using the time interval during a test of the DUT to control persisting numerous counters on a multitude of data streams and to create numerous time series data of the counters, allowing recording of counters from different sources asynchronously at different times. Further, the method can include, at a conclusion of the test, correlating the numerous time series data from the collected counters with test configuration data about a test state in the time intervals, and correlating data from external sources that also have imperfectly synchronized time bases.

In an implementation, the asynchronously recorded counters are correlated according to the specified time interval, such that counters having different time stamps are correlated to a same interval.

In a further implementation the test configuration data, having different time stamps, and the data from the external sources, having different time stamps, are correlated according to the specified time interval.

In an implementation a method of storing and time-correlating real-time and queryable test results of a test of a device under test (DUT), where the test of the DUT results in a multitude of data streams of multiple aspects of the DUT, is provided. The method can include initiating the test applied to the DUT according to test configuration data to collect, among multiple databases, real-time data from the multitude of data streams for the multiple aspects of the DUT, the collected data including counters and fact-type values, the collected data having imperfectly synchronized time bases among the multiple databases and the collected data being collected from different sources asynchronously at different times. Further, the method may include prior to applying the test to the DUT or during the application of the test on the DUT, specifying a user configurable recording time interval for recording the data collected among the multiple databases, recording the data collected among the multiple databases according to the specified recording time interval, such that each piece of the recorded data is associated with a particular time interval, having a duration of the specified recording time interval, in dependence upon time series information of the piece of data, at a conclusion of the test, correlating the recorded data with the test configuration data about a test state in the respective time intervals, and at the conclusion of the test or during the test performing a user defined query on the recorded data according to a user defined query time interval that is the same as or greater than the specified recording time interval.

In an implementation, the recorded data collected among the multiple databases can be recorded into a database that implements a star schema including a fact table and a dimension table.

In another implementation, the time series information is timestamp information.

Further, the recorded data can be treated as dimensional if timestamps are not available.

According to another implementation, when multiple pieces of data exist within the user defined query time interval for a particular aspect of the DUT, the user defined query on the recorded data provides a result based on at least one of determining a sum of the multiple pieces of data, determining an average of the multiple pieces of data, identifying a maximum value of the multiple pieces of data and identifying a minimum value of the multiple pieces of data.

In a further implementation, the recorded data includes data-plane data and control-plane data.

In an implementation the method includes providing, for display in a web user interface, results of the user defined query.

According to an implementation, the method further comprises changing a value of the user configured recording interval from one value to another value during the test applied to the DUT.

A system implementation of the technology disclosed includes one or more processors coupled to memory. The memory is loaded with computer instructions for performing any of the methods described above.

Other implementations may include a non-transitory computer readable storage medium storing instructions executable by a processor to perform functions of the system and/or methods described above.

Each of the features discussed in this particular implementation section for the first system implementation apply equally to the CRM implementation. As indicated above, all the system features are not repeated here and should be considered repeated by reference.

We claim as follows:

1. A method of storing and time-correlating real-time and queryable test results of a test of a device under test (DUT), where the test of the DUT results in a multitude of data streams of multiple aspects of the DUT, the method comprising:
    initiating the test applied to the DUT according to test configuration data to collect, among multiple databases, real-time data from the multitude of data streams for the multiple aspects of the DUT, the collected data including counters and fact-type values, the collected data having imperfectly synchronized time bases among the multiple databases and the collected data being collected from different sources asynchronously at different times;
    prior to applying the test to the DUT or during the application of the test on the DUT, specifying a user configurable recording time interval for recording the data collected among the multiple databases;
    recording the data collected among the multiple databases according to the specified recording time interval, such that each piece of the recorded data is associated with a respective particular time interval, which has a duration of the specified recording time interval, each piece of the recorded data being associated with the respective particular time interval in dependence upon time series information of the piece of data;
    at a conclusion of the test, correlating the recorded data with the test configuration data about a test state in the respective time intervals; and
    at the conclusion of the test or during the test performing a user defined query on the recorded data according to a user defined query time interval that is the same as or greater than the specified recording time interval according to which the data collected among the multiple databases is recorded,
    wherein, when multiple pieces of data exist within the user defined query time interval for a particular aspect of the DUT, the user defined query on the recorded data provides a single result, per each respective time interval that is equal to the user defined query time interval for the particular aspect of the DUT, that is determined based on the multiple pieces of data that exist within the respective time interval.

2. The method of claim 1, wherein the recorded data collected among the multiple databases is recorded into a database that implements a star schema including a fact table and a dimension table.

3. The method of claim 1, wherein the time series information is timestamp information.

4. The method of claim 3, wherein the recorded data is treated as dimensional if timestamps are not available.

5. The method of claim 1, wherein the recorded data includes data-plane data and control-plane data.

6. The method of claim 1, further comprising providing, for display in a web user interface, results of the user defined query.

7. The method of claim 1, further comprising changing a value of the user configured recording interval from one value to another value during the test applied to the DUT.

8. A non-transitory computer-readable recording medium having a program recorded thereon, the program for storing and time-correlating real-time and queryable test results of a test of a device under test (DUT), where the test of the DUT results in a multitude of data streams of multiple aspects of the DUT, and the program, when executed on a computer, causes a processor of the computer to perform a method comprising:
    initiating the test applied to the DUT according to test configuration data to collect, among multiple databases, real-time data from the multitude of data streams for the multiple aspects of the DUT, the collected data including counters and fact-type values, the collected data having imperfectly synchronized time bases among the multiple databases and the collected data being collected from different sources asynchronously at different times;
    prior to applying the test to the DUT or during the application of the test on the DUT, specifying a user configurable recording time interval for recording the data collected among the multiple databases;
    recording the data collected among the multiple databases according to the specified recording time interval, such that each piece of the recorded data is associated with a respective particular time interval, which has a duration of the specified recording time interval, each piece of the recorded data being associated with the respective particular time interval in dependence upon time series information of the piece of data;
    at a conclusion of the test, correlating the recorded data with the test configuration data about a test state in the respective time intervals; and
    at the conclusion of the test or during the test performing a user defined query on the recorded data according to a user defined query time interval that is the same as or greater than the specified recording time interval according to which the data collected among the multiple databases is stored, wherein, when multiple pieces of data exist within the user defined query time interval for a particular aspect of the DUT, the user defined query on the recorded data provides a single result, per each respective time interval that is equal to the user defined query time interval for the particular aspect of the DUT, that is determined based on the multiple pieces of data that exist within the respective time interval.

9. The non-transitory computer-readable recording medium of claim 8, wherein the recorded data collected among the multiple databases is recorded into a database that implements a star schema including a fact table and a dimension table.

10. The non-transitory computer-readable recording medium of claim 8, wherein the time series information is timestamp information.

11. The non-transitory computer-readable recording medium of claim 10, wherein the recorded data is treated as dimensional if timestamps are not available.

12. The non-transitory computer-readable recording medium of claim 8, wherein, when multiple pieces of data exist within the user defined query time interval for a particular aspect of the DUT, the user defined query on the recorded data provides a result based on at least one of determining a sum of the multiple pieces of data, determining an average of the multiple pieces of data, identifying a maximum value of the multiple pieces of data and identifying a minimum value of the multiple pieces of data.

13. The non-transitory computer-readable recording medium of claim 8, wherein the recorded data includes data-plane data and control-plane data.

14. The non-transitory computer-readable recording medium of claim 8, wherein the method further comprises providing, for display in a web user interface, results of the user defined query.

15. The non-transitory computer-readable recording medium of claim 8, wherein the method further comprises changing a value of the user configured recording interval from one value to another value during the test applied to the DUT.

16. A system including one or more processors coupled to memory, the memory loaded with computer instructions to store and time-correlate real-time and queryable test results of a test of a device under test (DUT), where the test of the DUT results in a multitude of data streams of multiple aspects of the DUT, the instructions, when executed on the processors, implement actions comprising:

initiating the test applied to the DUT according to test configuration data to collect, among multiple databases, real-time data from the multitude of data streams for the multiple aspects of the DUT, the collected data including counters and fact-type values, the collected data having imperfectly synchronized time bases among the multiple databases and the collected data being collected from different sources asynchronously at different times;

prior to applying the test to the DUT or during the application of the test on the DUT, specifying a user configurable recording time interval for recording the data collected among the multiple databases;

recording the data collected among the multiple databases according to the specified recording time interval, such that each piece of the recorded data is associated with a respective particular time interval, which has a duration of the specified recording time interval, each piece of the recorded data being associated with the respective particular time interval in dependence upon time series information of the piece of data;

at a conclusion of the test, correlating the recorded data with the test configuration data about a test state in the respective time intervals; and at the conclusion of the test or during the test performing a user defined query on the recorded data according to a user defined query time interval that is the same as or greater than the specified recording time interval according to which the data collected among the multiple databases is recorded, wherein, when multiple pieces of data exist within the user defined query time interval for a particular aspect of the DUT, the user defined query on the recorded data provides a single result, per each respective time interval that is equal to the user defined query time interval for the particular aspect of the DUT, that is determined based on the multiple pieces of data that exist within the respective time interval.

* * * * *